(12) United States Patent
Duquette

(10) Patent No.: US 8,781,947 B2
(45) Date of Patent: *Jul. 15, 2014

(54) SYSTEM AND METHOD FOR ANALYZING AND DISPLAYING SECURITY TRADE TRANSACTIONS

(75) Inventor: Douglas R. Duquette, Glencoe, IL (US)

(73) Assignee: Trading Technologies International, Inc., Chicago, IL (US)

(*) Notice: Subject to any disclaimer, the term of this patent is extended or adjusted under 35 U.S.C. 154(b) by 115 days.

This patent is subject to a terminal disclaimer.

(21) Appl. No.: 13/400,553

(22) Filed: Feb. 20, 2012

(65) Prior Publication Data

US 2012/0203683 A1 Aug. 9, 2012

Related U.S. Application Data

(63) Continuation of application No. 12/512,182, filed on Jul. 30, 2009, now Pat. No. 8,150,760, which is a continuation of application No. 11/417,680, filed on May 3, 2006, now Pat. No. 7,593,887, which is a continuation of application No. 10/517,960, filed as application No. PCT/US03/18436 on Jun. 11, 2003, now Pat. No. 7,590,587.

(60) Provisional application No. 60/389,636, filed on Jun. 18, 2002.

(51) Int. Cl.
*G06Q 40/06* (2012.01)

(52) U.S. Cl.
USPC .............................. 705/37; 705/35; 705/36 R

(58) Field of Classification Search
CPC ...................................................... G06Q 40/06
USPC .......................................................... 705/37
See application file for complete search history.

(56) References Cited

U.S. PATENT DOCUMENTS

| | | | |
|---|---|---|---|
| 5,297,032 A | 3/1994 | Trojan et al. |
| 5,454,104 A | 9/1995 | Steidlmayer et al. |
| 5,924,082 A | 7/1999 | Silverman et al. |
| 6,195,647 B1 | 2/2001 | Martyn et al. |
| 6,278,982 B1 | 8/2001 | Korhammer et al. |
| 6,418,419 B1 | 7/2002 | Nieboer et al. |
| 6,618,707 B1 | 9/2003 | Gary |
| 7,428,506 B2 | 9/2008 | Waelbroeck et al. |
| 7,590,587 B2 | 9/2009 | Duquette |

(Continued)

OTHER PUBLICATIONS

International Search Report of International Application No. PCT/US2003/018436, dated Jan. 3, 2004 (mailed Jan. 13, 2004).

*Primary Examiner* — James A Vezeris
(74) *Attorney, Agent, or Firm* — McDonnell Boehnen Hulbert & Berghoff LLP

(57) ABSTRACT

Processing and charting security exchange trading and market information shows security traders if current transactions originated as buy orders or sell orders, and simultaneously indicates traded quantity. Security exchange trading information is received that includes the price, volume and time of each trade. In addition, security exchange market information is received from buyers, specifying bide prices and quantities, and from sellers, specifying asking prices and quantities. The security exchange trading and market information is processed simultaneously and displayed as a continuously updated real-time chart depicting the exchange auction process whereby buyers and sellers agree to trade at specified prices, including details of individual transactions. The chart is formed by plotting each trade at the price traded, and for each plot point shows a distinctive icon indication whether the transaction was initiated by a buyer or seller.

26 Claims, 14 Drawing Sheets

(56) References Cited

U.S. PATENT DOCUMENTS

| | | |
|---|---|---|
| 7,593,887 B2 | 9/2009 | Duquette |
| 7,620,587 B2 | 11/2009 | Duquette |
| 7,680,721 B2 | 3/2010 | Cutler |
| 2002/0007335 A1 | 1/2002 | Millard et al. |
| 2002/0052827 A1 | 5/2002 | Waelbroeck et al. |
| 2003/0004853 A1* | 1/2003 | Ram et al. ............... 705/37 |
| 2003/0023542 A1 | 1/2003 | Kemp, II et al. |
| 2003/0069834 A1 | 4/2003 | Cutler |
| 2006/0265317 A1 | 11/2006 | Duquette |
| 2006/0265320 A1 | 11/2006 | Duquette |
| 2009/0292650 A1 | 11/2009 | Duquette |
| 2009/0292651 A1 | 11/2009 | Duquette |
| 2009/0292652 A1 | 11/2009 | Duquette |
| 2009/0319441 A1 | 12/2009 | Duquette |

\* cited by examiner

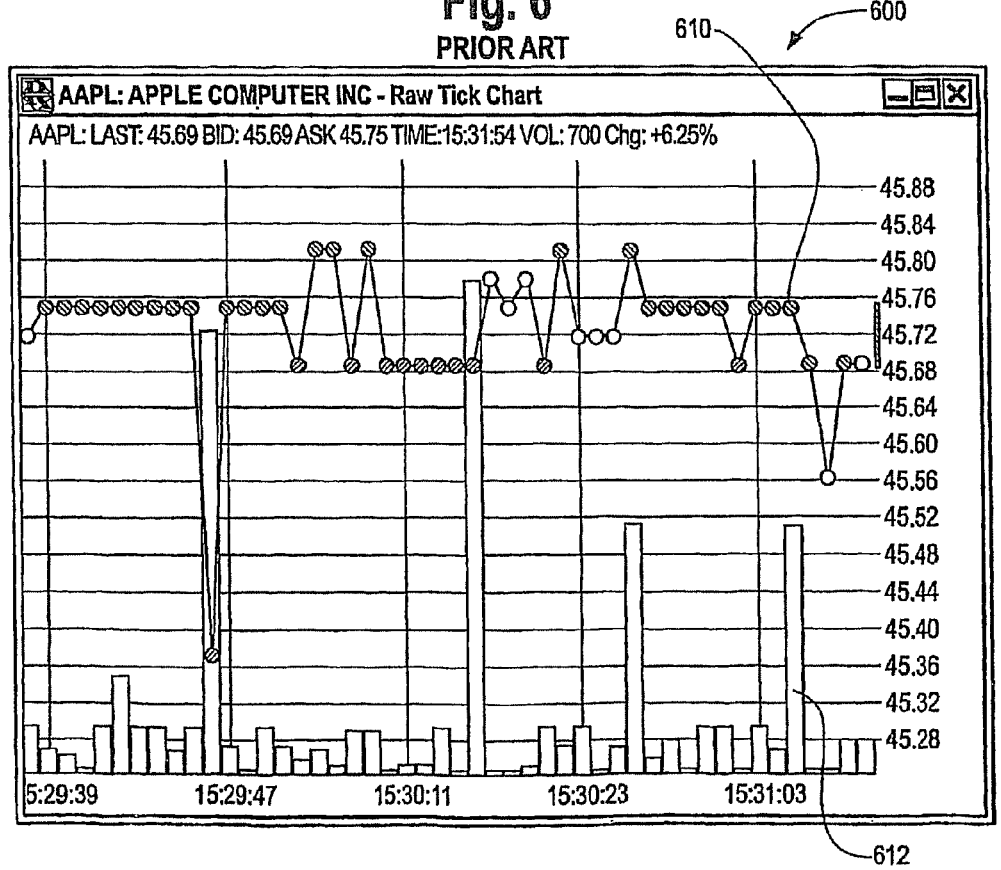

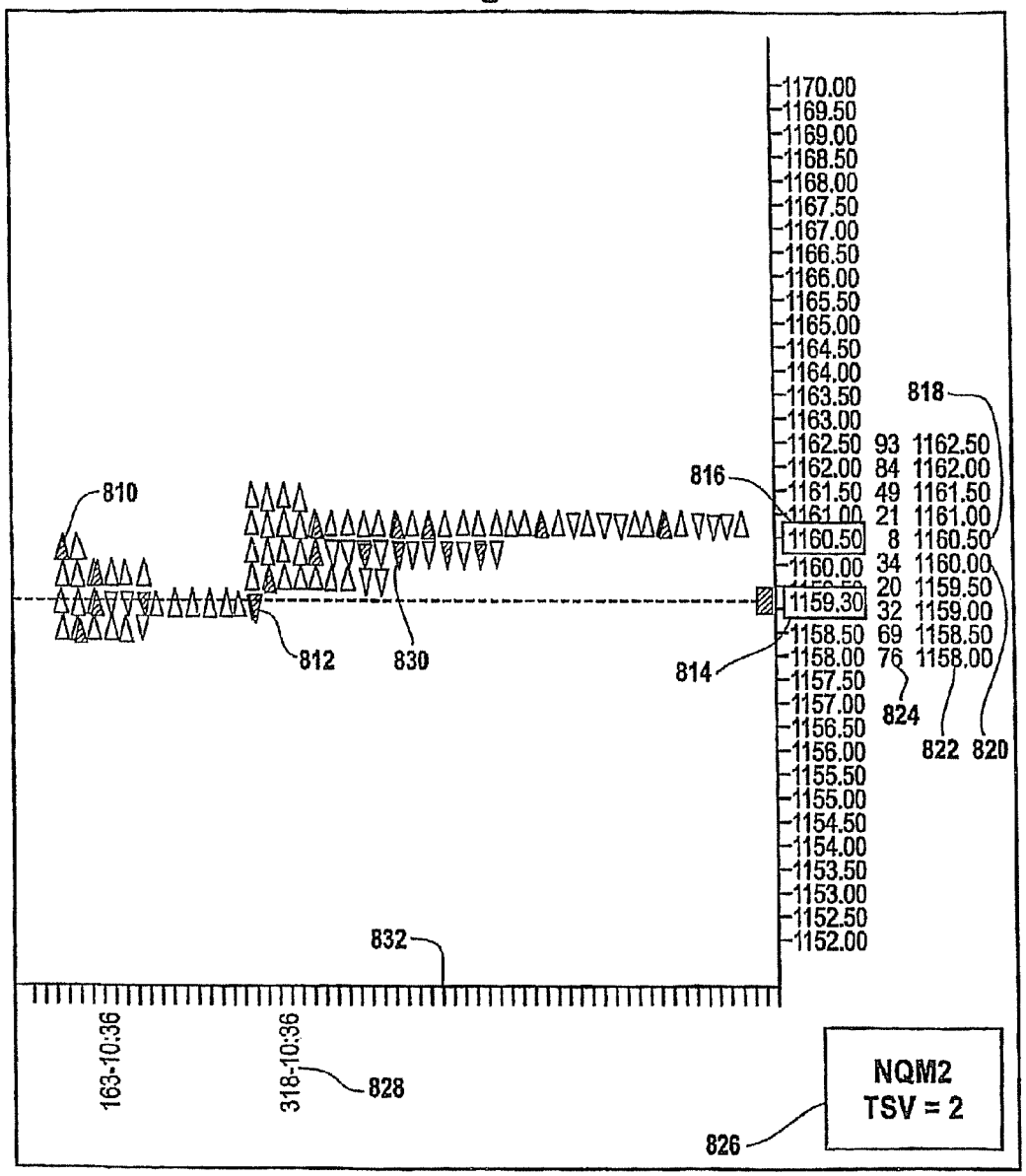

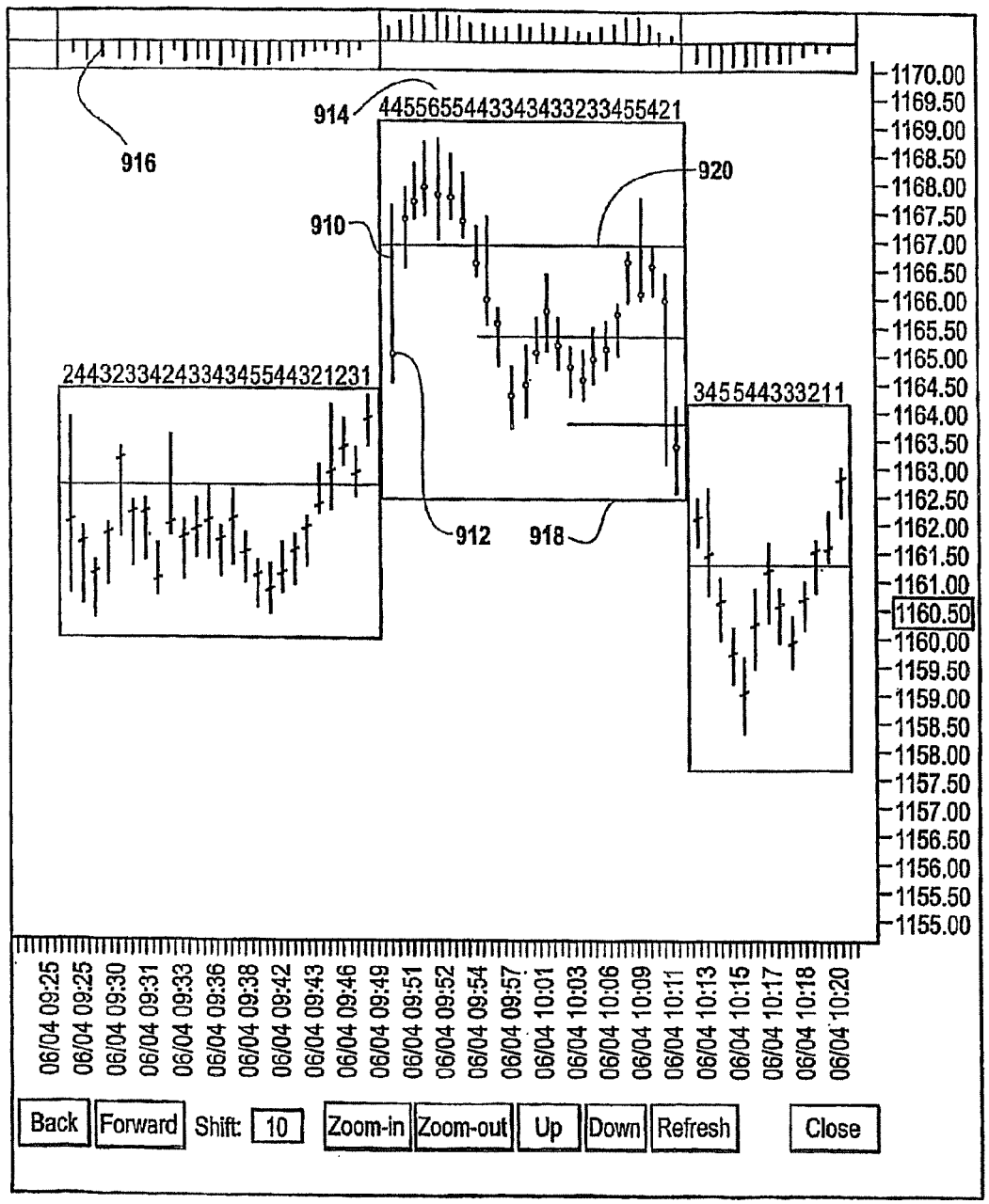

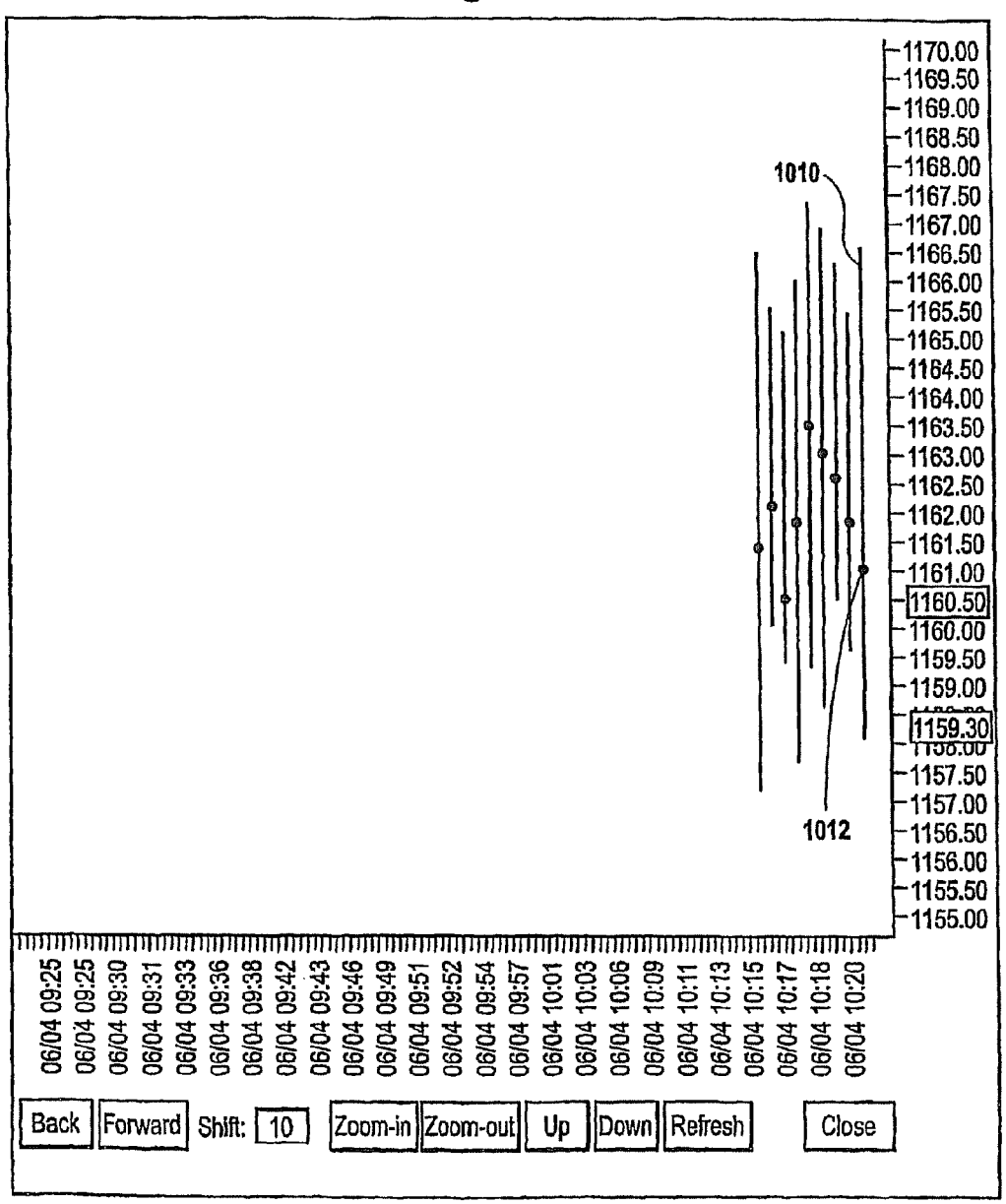

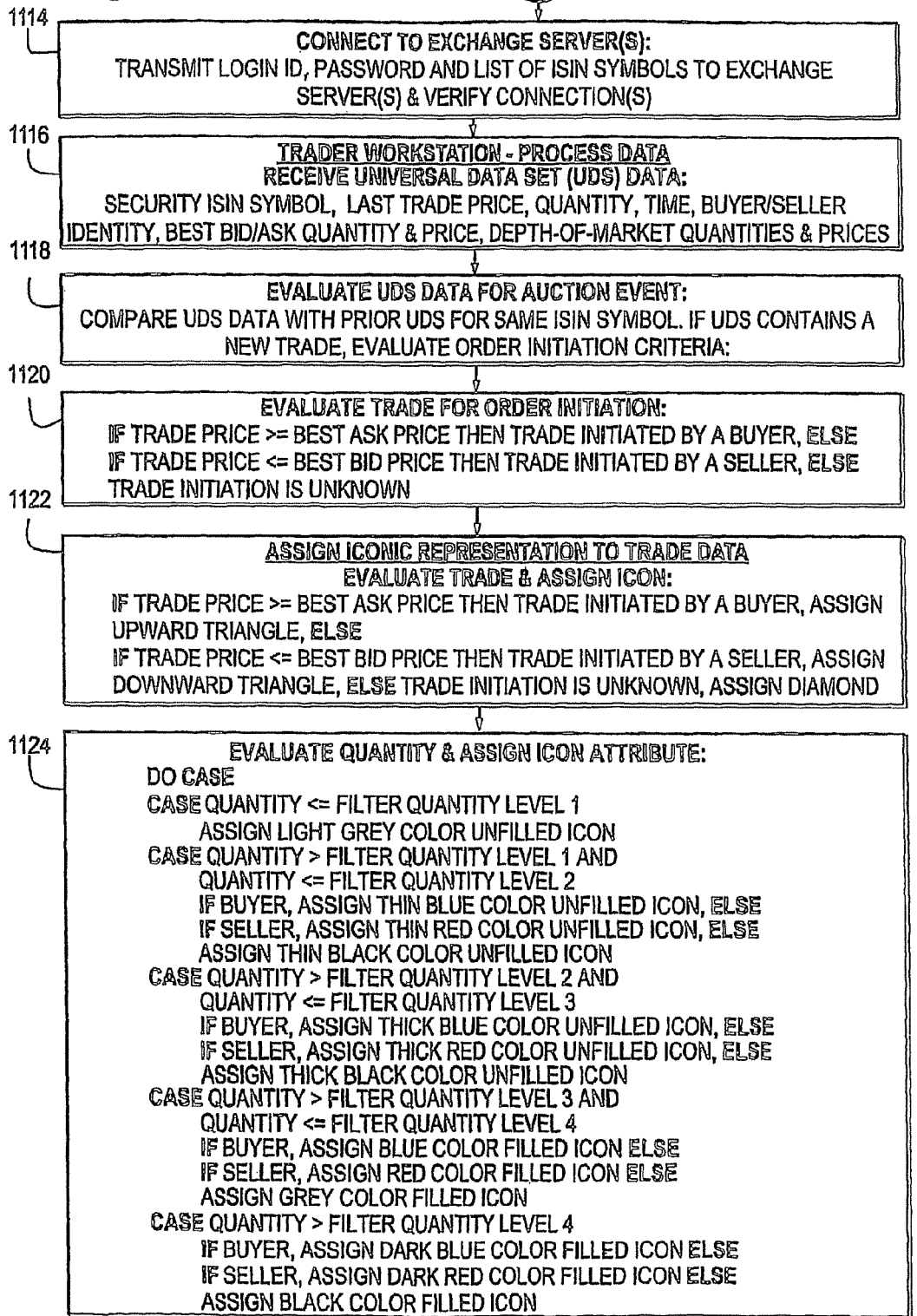

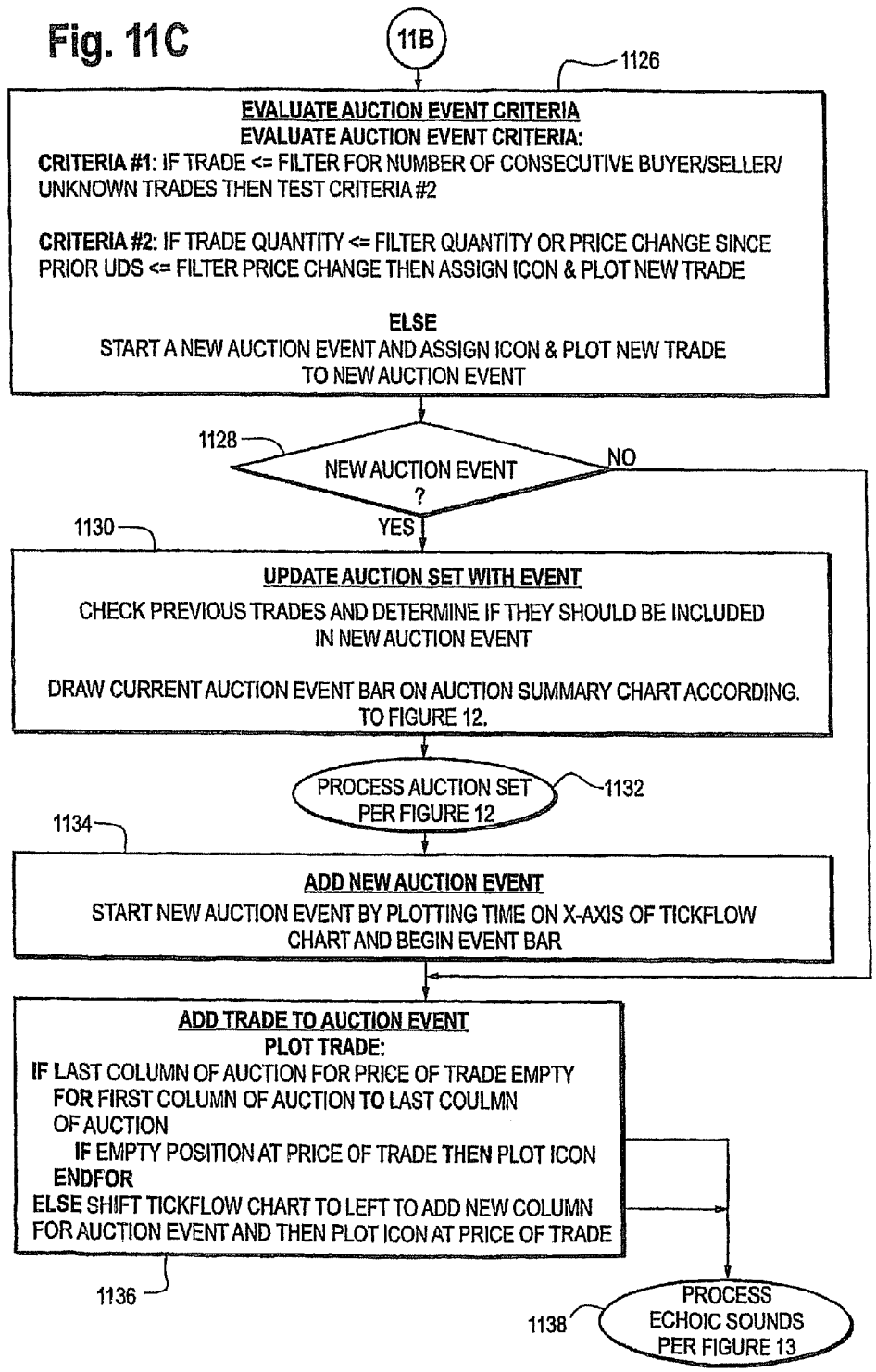

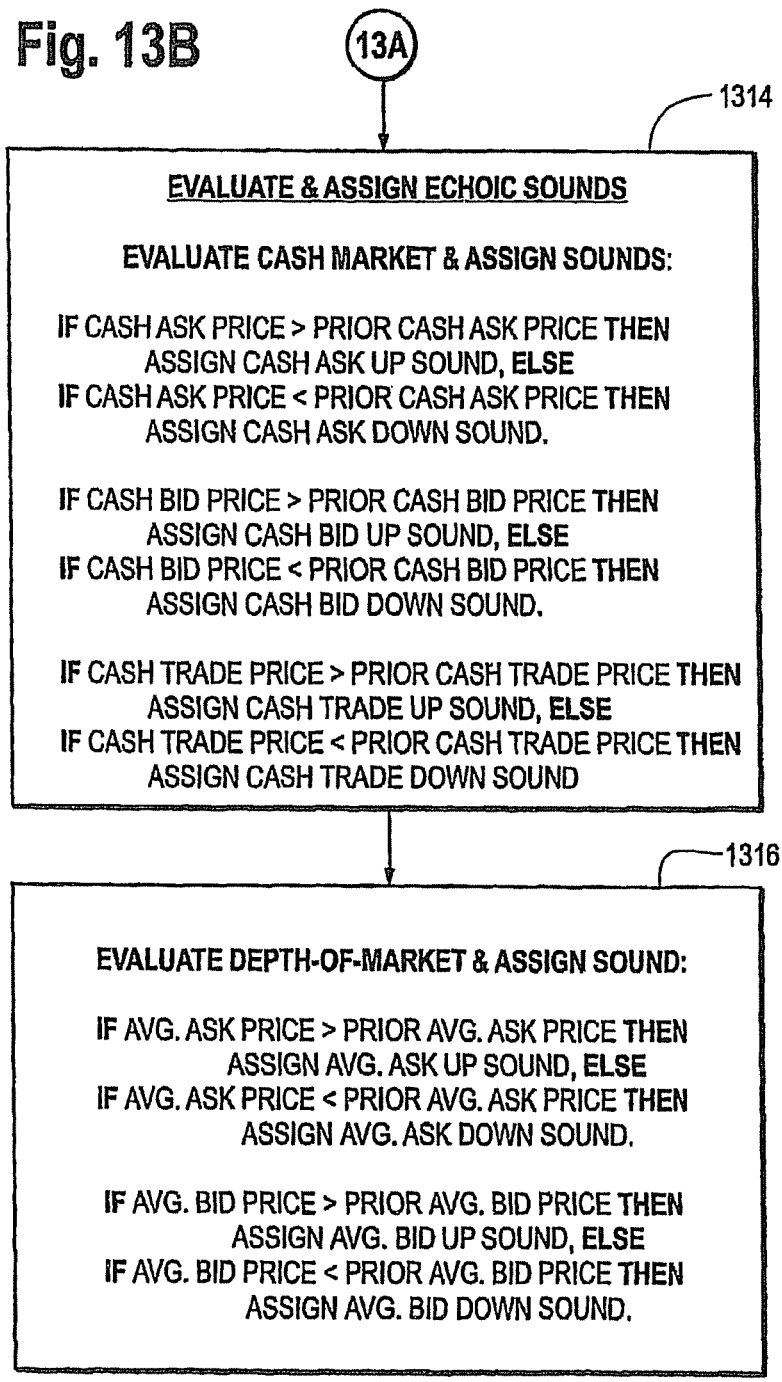

US 8,781,947 B2

SYSTEM AND METHOD FOR ANALYZING AND DISPLAYING SECURITY TRADE TRANSACTIONS

CROSS-REFERENCE TO RELATED APPLICATIONS

The present application is a continuation of U.S. patent application Ser. No. 12/512,182, now U.S. Pat. No. 8,150,750, filed on Jul. 30, 2009, entitled "System and Method for Analyzing and Displaying Security Transactions," which is a continuation of U.S. patent application Ser. No. 11/417,680, now U.S. Pat. No. 7,593,887, filed on May 3, 2006, which is a continuation of U.S. patent application Ser. No. 10/517,960, now U.S. Pat. No. 7,590,587, filed on Dec. 14, 2004, which is a National Stage Entry of International Patent Application No. PCT/US03/18436 filed Jun. 11, 2003, which claims the benefit of U.S. Provisional Patent Application No. 60/389,636, filed Jun. 18, 2002, the contents of all of which are fully incorporated herein by reference.

FIELD OF THE INVENTION

This application relates to systems and methods for analyzing and displaying securities transactions, and more particularly to systems and methods for displaying the details of securities market transactions and order books in near realtime so as to provide the user with information that closely approximates the quality and quantity of information available to a trader on an exchange floor.

BACKGROUND OF THE INVENTION

A large number of systems have been developed to support securities trading by persons who, for one reason or another, are not present at the floor of an exchange. Early systems delivered information describing transactions to remote locations by telephony or telegraphy. However, the information reported was typically quite limited, and might include, for example, the symbol, price and quantity of a security transaction. In addition, these systems generally employed manual processes and relatively slow information transmission media, such that when markets were busy, transaction reports experienced significant delays, and some transactions were not reported. As information and telecommunications technologies advanced, subsequent systems have improved the timeliness with which information has been delivered.

However, even these later systems have proven inadequate in that they do not provide sufficient detail about the transactions and the market, or fail to usefully present such detail, to enable a trader to understand individual transactions and the trends that streams of such transactions represent, and therefore make rapid, profit-maximizing trading decisions.

The basic technique for making money in securities markets can be summed up in four words: buy low, sell high (or vice-versa for short sellers). A successful investor is a securities trader who can obtain a profit while minimizing exposure to the investment risk of losing a significant amount of capital.

Securities markets are made possible by government authorized and regulated exchanges that bring together buyers and sellers of securities in an auction process whereby trading prices are discovered and trades are executed between the parties. The process of buying and selling of securities occurs at several levels, from the point of origination as individual investors or professional money management organizations, to broker/dealers or futures commission merchants (FCM) acting as market makers, specialists, agents, and clearing firms, to the exchanges and related Electronic Communication Networks (ECN) which serve as the match makers to complete the trading auction process.

Investors may choose a shorter or longer period of time to own a security, with longer investment periods generally exposing an investor to more risks due to unknown or unforeseen changes in circumstances, including the underlying bases for valuation of an investment. As part of investment decision-making, investors may apply basic investment strategies in their effort to try to buy low and sell high: (1) fundamental analysis; (2) technical analysis; or (3) a combination of fundamental and technical analysis.

Investors choosing to hold securities for a longer period of time are likely to use fundamental analysis to determine if the current value of a security is fair and to assess the future potential for the security to produce income, or increase in value for a capital gain. Investors choosing to hold securities for a shorter period of time are likely to use technical analysis to determine if a change in supply or demand will change the value of a security, thereby allowing the investor to trade the security for a quick profit.

Technical analysis uses a variety of displays and statistical calculations to monitor trading prices and trading volumes, usually for fixed time intervals, to assist investors who try to make profits based on the short-term swings of the market. Traders who depend on technical analysis range from market makers, who are continuously trading and making buy and sell orders, to day traders, who try to take advantage of hourly or daily price changes to make a profit, to slightly longer-term investors who track stock price and trading volume fluctuations over a period of a few days or weeks and trade on the basis of recent trends. Technical analysis focuses on patterns that appear on the historical price charts of a security in the belief that historical price patterns may repeat, or that recent price trends may help predict the future price of a security.

Technical analysis, as generally practiced, is based on a review of historical time series data, such as a series of daily closing prices for a security. A number of known statistics have been derived from the processing of time series data, and trading systems have been developed to produce and display them. These statistics include moving averages, support and resistance values, stochastic oscillators, along with specialized quantitative studies such as Bollinger bands, Fibonacci curves, and candlestick charts. FIG. 1 depicts a candlestick chart 100, which incorporates vertical bars 110 representing cumulative trading activity during an interval. The Vertical bars have a thin portion, such as bar 112, which represents the range of prices during the interval, and a thick portion 114 which may indicate some other information, such as the direction of price change between the first and last price reported during the interval. Time series data is also summarily displayed in various fixed time intervals, from tens of seconds to minutes, hours, days, months or years. For example, FIG. 2 depicts a line chart 200, on which may be plotted a line 210 showing an aspect of a security, such as daily closing price, over an extended interval. For another example, FIG. 3 depicts a bar chart 300. Each bar, such as 310, represents a range of trading prices over an interval, and additional markings 312, 314, may represent another parameter, such as opening and closing prices.

Thus, as shown in the examples noted above, most known technical charting systems do not plot each transaction, or 'tick', but instead sample and display a representation of price activity at a periodic rate.

Previously, the most active traders, or market makers, conducted transactions in person on exchange floors, and did not depend on computer systems to interact with each other. Traders present on an exchange floor benefit from the ability to observe individual transactions in a security. In addition, such traders may also observe the number and price of prospective transactions (i.e., bids to purchase or offers to sell) by other participants. This information is sometimes referred to as "order book" or "depth of market" information, and can assist a trader in discerning market trends. Traders present on an exchange floor may also observe many visual and auditory cues relating to the behavior of market participants. The increased use of all electronic market exchanges, however, is pushing market makers off of exchange floors and creating a need for new chart displays to represent market activity for each transaction, or "tick".

One prior-art approach to displaying transaction-related information is to produce a quotation table reporting, for example, the most recent transaction. A tick trend indicator, usually a '+', '−', or '=' sign, is provided to indicate whether the price of the most recent transaction is higher, lower, or the same as the previous transaction. Several trend indicators may be shown, coarsely depicting the history of trend indicators. However, this table arrangement does not show a history of individual transactions in a particular security, and does not represent the transactions in the form of a two-dimensional chart or graph.

Another prior-art approach to displaying transaction-related information is a conventional "tick chart" which shows price levels of transactions as a continuously adjusted line. The chart is arranged so that transaction information is plotted against time, so that individual transactions cannot be easily resolved, particularly where those transactions occur around the same time. When presenting 'tick' charts that display a mark for each transaction, prior art systems typically represent the transaction 'tick' with a dot or colored circle plotted at the price of the transaction. Sometimes the 'tick' dots are connected by a line (see FIG. 6), and other times 'ticks' are transformed into a continuous line that moves horizontally and vertically without showing any dots. However, these systems do not lend themselves to rapid determination of market conditions, because they do not indicate individual transactions, or they do not allow easy, unequivocal determination of order initiation a critical determining factor in price trend detection as defined and shown subsequently hereto.

FIG. 4 shows an alternative form of a tick chart, called the point-and-figure chart 400, which was originally developed by floor traders who kept paper and pencil hand charts for quick reference. This method plots transactions into columns, e.g. 410, for successive trades that maintain an upward or downward trend. If the price trend reverses by a preset arbitrary amount of minimum price increments, the plotting moves to the next column, e.g. 412. Point-and-figure charts alternately plot X's and O's across columns. Point-and-figure charting is unsatisfactory for several reasons: not all transactions are displayed because only transactions that meet filter criteria based on the amount of a price increase or decrease between successive transactions are plotted; there is no indication of trading volume; and buyer/seller order initiation is not indicated.

During trading days, some trading systems monitor and display a variety of general statistics to indicate market breadth and depth. These include such items as number of new highs, number of new lows, number of advancers, number of decliners, volume up, volume down and various ratios applied to said items. The tabular representation can also be presented in chart form when the daily market statistics are shown for larger time intervals. General market statistics are mentioned here in passing because they are frequently cited when describing markets, however such market statistics do not provide detailed information regarding individual transactions occurring in a market.

The prior art technical analysis systems have focused on 'what' happened in security markets—what prices, what volumes, what statistics for a fixed period of time, or some other fixed periodicity method of data sampling, such as tick bar charts that draw a new bar for every n-number of ticks and then samples the results for high, low and close prices. From the observations thus gathered, prior art technical analysis systems attempt to explain why trading occurred in the past according to apparent patterns, and 'why' trading is likely to respond in the future based on a potential repetition of past patterns and to values established from analysis of historical data.

Technical analysis is a somewhat artificial approach to predicting security prices because of the false assumption that past observations are a reasonable basis for determining future actions and results, when in fact the act of functioning security markets is to bring together buyers and sellers and establish mutually acceptable prices for executing transactions in a process that balances supply and demand for a security. It is further hampered by the attempt to use a periodic sampling process as an input database to their calculative output in an attempt to describe the non-periodic, even chaotic, market trading process.

In contrast to technical analysis, academic research compares security trading to a 'random walk' that has no set pattern and no association of historical precedent with future action. While no definitive answer has been obtained as to the validity of technical analysis, a plausible assumption is that if enough traders use technical analysis as a basis for making trading decisions, then technical analysis will at least to some extent be a self-fulfilling prophecy, by virtue of the fact that if enough trading orders are executed due to a technical event then supply and demand will be affected, and a security price will respond as suggested by the technical analysis. This too is a dubious assumption as any market activity is observed and responded to by various participants, with various motives, over and over again, resulting in a completely random and chaotic system.

Current methods of fixed or periodic data sampling are further limited to the question of "at what specific prices did the market trade during the given interval?" This same question is further limited by the prior art data sampling approaches as the samples are customarily for only the highest/lowest/first/last prices traded during the interval, leaving all other activity unexposed and unavailable for analysis. Using the prior art approaches, the only thing we can know from the outputs of these systems is that at least 1 transaction of unknown characteristics occurred at each of these so called sample prices during the specified time interval.

How an order is initiated is fundamental to the price discovery process that balances supply and demand through the subsequent process of discovering a mutually acceptable trading price. If more orders are initiated as buy orders, both in terms of price and volume, the existing supply of willing sellers is absorbed and suppliers may notice the increase in demand and raise prices to opportunistically increase the proceeds they may realize from entering into a trade. Conversely, if more orders are initiated as sell orders, then some buyers will be absorbed and buyers may notice the increase in supply and lower prices to protect against the possibility of being exposed to a loss from even lower prices after making a purchase. Both activities cause security prices to rise and fall accordingly. This change in price is what creates security trading profit opportunities.

Knowing how orders are flowing into an exchange making a market for a security, either as buy orders or sell orders, is an essential part of the information needed by the participants to the exchange trading process, when trying to assess the balance of supply and demand and the potential for a security price to move up or down. The failure of the prior art of technical analysis to recognize and display for each trade how orders are initiated, and to integrate an indication of the size of said orders, is a significant disadvantage.

One approach to displaying information relating to the source of orders is to display so-called depth of market information. For example, a software package sold under the name "Patsystems J-Trader" displays a depth-of-market window, an example of which is shown in FIG. 5. The depth-of-market display 500 includes separate tables listing a number of pending bids (advertisements to buy) 510 and pending offers (advertisements to sell) 512 at their respective prices and quantities. Kemp, II, et al, U.S. Publication No. 2003/0023542 discloses an alternative tabular format for depth of market information, in which bids and offers are displayed in separate vertical columns, instead of side-by-side. However, the depth of market information in both of these systems is not integrated with graphical information displaying transaction activity. In addition, discerning whether a transaction has originated as a buy or sell requires intense vigilance on the part of a user in observing that a transaction has occurred at a particular price and noticing a change in the number of units bid or offered at that price.

FIG. 6 depicts the display 600 of a security charting product available under the name "Investor/RT" from Linnsoft Software. "Ticks" (or security transactions) are indicated by circles 610 filled in various colors, e.g., green, red, or brown, corresponding to buyer, seller and undetermined neutral orders, respectively. Trade quantity is presented with separate histogram bars 612 along the bottom of the 'tick' chart. The approach of using filled circles is not satisfactory because it depends on the color coding alone to convey the indication of buyers and sellers, which is not effective when printed in black and white, as with most laser printers, or when shown on monochrome display screens, because the colored circles all appear the same, as seen in the black and white specimen shown in FIG. 6. In addition, the lack of integration in the display of transaction price, order initiation, and transaction size undesirably requires the trader to perform that integration as a manual process. Further, the Investor/RT system does not directly display depth-of-market information or other indicia of pending orders on the transaction display. "4D Genie", commercial product from 4D Trading, 4D Trading Ltd, Unit 11, Riverside Studios, 28 Park Street, London SE1 9EQ, discloses a system that displays a chart of recently traded prices in tick format. The product also displays depth of market information.

Steidlmayer et al. U.S. Pat. No. 5,454,104 discloses a financial data event flow analysis system with study conductor display. The system controls and manages "a continuous sequence of data by conducting studies on user-defined segments of the data, and [displays] the study results in a concentrated summary form in vertical pipes on a single display screen." A commercial product sold under the name "Market Profile" and associated with the inventors of the Steidlmayer patent plots so-called "Time Price Opportunities" (TPOs) as letters arranged in vertical columns. Each letter corresponds to a defined time segment, such as a particular half-hour period during the day. The vertical axis corresponds to price, so the vertical width of a letter represents aggregate trading within a relatively small price range, and a vertically contiguous series of a particular letter represents a larger price range formed by the concatenation of the contiguous letters. If a letter appears at a particular price, at least one trade occurred in that price range during the time period represented by the letter. Trading activity is aggregated over numerous time segments, generating a display showing the aggregate distribution of TPOs over a study period. Because the Steidlmayer system aggregates trades, and displays price ranges, it does not necessarily depict the time, price or quantity of any particular transaction.

Many of the prior-art trading analysis and display systems, including the Steidlmayer system, aggregate or sample transactions over arbitrary periods that may have no relevance to the activity of the market and its participants. As noted earlier, trading of securities involves buyers and sellers in an auction process whereby trading prices are discovered and trades are executed between the parties. Trading usually varies in intensity during a given trading day as traders establish price points and subsequently execute trading orders around said price points. Each such group of trades may be logically grouped and considered to be an auction event within the trading day. An auction event, or series of trades around a price point, register elapsed times which vary randomly from a few tens of seconds to a few hours dependant on participant activity, before a significant change in price point is discovered and a new auction event starts. In the course of a trading day many short auctions can occur in the continuing process of making a market and balancing supply and demand for a security.

Although many prior art trading analysis and display systems have some sort of transaction aggregation or grouping, such systems have provided grouping or aggregation on arbitrary boundaries, rather than boundaries discerned from the actual ebb and flow of trading activities. Accordingly, where the arbitrary aggregation and grouping of a trading system happens to be unaligned with actual trading activity, trends in that activity may be masked or incorrectly interpreted, and false trends may be seen.

Accordingly, the need exists for a high-performance securities trading analysis and display system that integrates the detailed transaction information needed by a trader to make profit-maximizing trading decisions. In addition, the need exists for a system that provides appropriate analysis and display of trend information derived from and aligned with actual transaction activity in the market.

OBJECT AND SUMMARY OF THE INVENTION

It is therefore an object of the present invention to provide an arrangement for analyzing and displaying security trade transactions that avoids the aforementioned disadvantages of prior art systems.

A system (and associated methods for use in conjunction therewith) arranged according to the present invention for analyzing and displaying security trade transactions to a user and for receiving from a user security trade orders comprises at least one exchange server, at least one trader administration and risk manager workstation coupled to the exchange server, at least one trader workstation also coupled to the exchange server, appropriate software described further herein, and appropriate telecommunications and networking facilities to allow communications among the servers and workstations. The servers and workstations may be implemented using industry-standard IBM-PC compatible computers of known design. Although these elements are referred to in the drawings and the text as separate units, one or more of them may be integrated in the same physical computer system. Although the trader workstation and exchanger server is typically mentioned herein in the singular, several of each may be present.

The exchange server is connected to the exchange market data and trading system of at least one securities exchange via conventional high-speed networking and telecommunications facilities, to receive securities trade transaction information (and other related information) on a near-real-time basis, and to transmit securities trade orders. The exchange server reformats data received from various exchanges in disparate formats into a universal format for use by the trader workstations.

The trader workstations provide display processing to present information about securities trade transactions (including analyzed information) for securities selected by the user in three primary display formats. The trader workstations interact with the exchange server to obtain information about the trade transactions in the selected securities, along with other related information, and display it to a user. The trader workstations may optionally provide "echoic" or sound-cue representations of data and events. The trader workstations provide a user interface to enable the user to select securities for display, for controlling parameters of the display and analysis system, such as the criteria for when a new auction is deemed to begin, or the criteria controlling when an echoic indicia is provided. The user interface of the trader workstation may allow a trader to enter an order for a transaction in one of the securities for which information is displayed; the order information is forwarded to the exchange server, and then to the securities exchange.

The administrative and risk management workstation controls access to the display and order entry systems, and allows administrative personnel to monitor activity for transactions of interest, including those that may indicate that a trader is engaging in activity which the system operator may consider to carry excessive risk.

The trader workstations may provide three primary displays regarding a selected security: a TICKFLOW display, and optionally, auction summary and auction set displays. The term "TICKFLOW" is a trademark of Tradegraph, L.L.C.

According to an aspect of the invention, a TICKFLOW display indicates the prices of recent transactions, the size of such transactions, and whether such transactions are deemed to be buyer-initiated or seller initiated. The security exchange trading and market information is processed and displayed as a continuously updated chart that plots each trade at the price traded and for each plot point shows: a triangle, arrow, or similar shape pointed up to indicate a trade initiated by a buyer; a triangle, arrow or similar shape pointed down to indicate a trade initiated by a seller; and a circle, diamond, or other shape, to indicate a trade if buy/sell order origination is not determined.

According to a further aspect of the invention, the TICKFLOW chart may also display "market depth" information regarding pending bids and offers for the security including the number of units and price at which such bids and offers are extended. Preferably, the market depth information is integrated with the price axis of the chart on the display screen and includes a list book of bid/ask orders, known as the book or depth-of-market (DOM) for a security, showing the quantity ordered at each bid/ask price level. By integrating a live DOM allowing a trader to enter orders by clicking on displayed DOM prices along side the security price chart, a trader can see and act upon all relevant pricing data at once without looking at different parts of a display to see the data or place orders in separate windows, as is the case in prior-art art systems. This is a significant improvement over prior-art systems because it allows traders to speed-up their interpretation of market activity, thereby allowing a trader to more quickly decide on appropriate trade order actions to take, and hopefully allows a trader to be the first to place a trade order before competing market participants also recognize and take advantage of the same trading opportunity.

By reviewing the chart, traders may determine if trading is composed more by buyers or by sellers, if orders placed by buyers or sellers are larger or smaller, and if the book of bid/ask orders is changing based on buying or selling activity. A trader can conclude that trading is directionally biased into an upward or downward trend based on orders originating from buyers or sellers and increase the probability of making a profit from buying low and selling high.

According to a further aspect of the invention, a user interface allows a trader to quickly enter limit orders to buy or sell a predetermined quantity of a security by scrolling with a computer pointing device, such as a mouse or track ball, over the depth-of-market bid/ask order listing and clicking or selecting the desired price with the computer pointing device buttons. Generally, a computer mouse is set-up such that one button enters a buy order and the second button enters a sell order. Additional buttons may be assigned related functions, such as canceling limit orders not yet filled by an exchange, so that a trader can quickly re-enter an order with a new limit order price. If the chart is used to display contract prices for future delivery, as may be the case for commodity, energy, financial, index, foreign currency and equity futures contracts, the chart may preferably also include plot points for the traded prices and bid/ask prices for the underlying cash market.

According to a further aspect of the invention, as trades are plotted, sound cues or tones are emitted as "echoic" or audible trading indications, depending on pre-specified criteria, to coincide with buyer/seller trading, quantity traded, price level alerts, and trading in underlying cash markets, if applicable.

According to a further aspect of the invention, the chart can be further filtered to group trades into self-creating auction events, depending on user-selected or predetermined criteria based on the number of sequential buyer or seller trades, quantity traded, and change in the traded price, or other auction criteria as may be applied. Auction events can then be recorded and displayed as bars on a separate auction chart where the bars show the low to high price range and volume weighted average price for trades grouped into each specific auction event. The TICKFLOW display identifies the time at which each auction begins.

According to a further aspect of the invention, if a facility to determine auction events is provided, an auction summary chart may be provided to display auctions for a selected security. The auction summary chart uses a bar chart format where every bar marker indicates the price range of each auction event, and the dot on an auction bar marker indicates the volume weighted average price (VWAP), modal price, or other derived characteristic determined for each auction. Once each auction event ends, a filter processes statistics derived from the auction event and a score, called a Trend Status Value (TSV) score is calculated and assigned to the auction and noted above the box drawn over the auction bar. A positive score tends to indicate support for increasing price, and a negative score tends to indicate support for decreasing price. Auction events and their TSV scores are analyzed to detect trends or "auction sets", which are delimited by a reversal in the TSV score. A box is drawn around the auctions belonging to a particular auction set to identify them. The TSV scores are also graphically displayed as small bars at the top of the auction summary chart marker making it easy for traders to detect the strength, direction and reversal of price change trends.

According to a further aspect of the invention, if a facility to determine auction events is provided, an auction set display may be provided to graphically summarize a series of auction sets. When a trend reversal is detected and a new auction set started, the previous auction set is summarized and drawn as a single bar on the auction set chart. A dot is placed on the auction set bar at the VWAP price point calculated for the auction set.

According to a further aspect of the invention, the security market and trade information are preferably displayed on real-time displays connected to exchanges and viewed by online traders with network or Internet access for the purpose of executing trades.

BRIEF DESCRIPTION OF THE DRAWINGS

These and other features of the invention will be best understood by reference to the following detailed description of a preferred embodiment of the invention, taken in conjunction with the accompanying drawings, in which like reference characters denote the same element, and in which:

FIG. 5 is a rendition of a "depth of market" window, a prior art method of displaying bid and offer prices, and the number of units offered at such prices, for a security;

FIG. 6 is a rendition of a tick chart, a prior-art method of displaying price, volume, and order initiation of security transactions, from Investor/RT, a known software product;

FIG. 8 is a rendition of a tick flow chart of the type produced by the trader workstation of the system 700 of FIG. 7, showing details of individual security transactions, auctions, and market depth information;

FIG. 9 is a rendition of an auction summary chart of the type produced by the trader workstation of the system 700 of FIG. 7, showing details of individual auctions, trend status values for such auctions, and auction sets;

FIG. 10 is a rendition of an auction set chart of the type produced by the trader workstation of the system 700 of FIG. 7, showing in summary form a plurality of auction sets of the type detailed in FIG. 9;

FIGS. 11B and 11C are continuations of the flow diagram of FIG. 11A;

FIGS. 13A and 13B are a flow diagram depicting a process 1300, for use in conjunction with the system 700 of FIG. 7, for assigning echoic sounds to transactions.

DETAILED DESCRIPTION OF THE PREFERRED EMBODIMENTS

Figure 7:
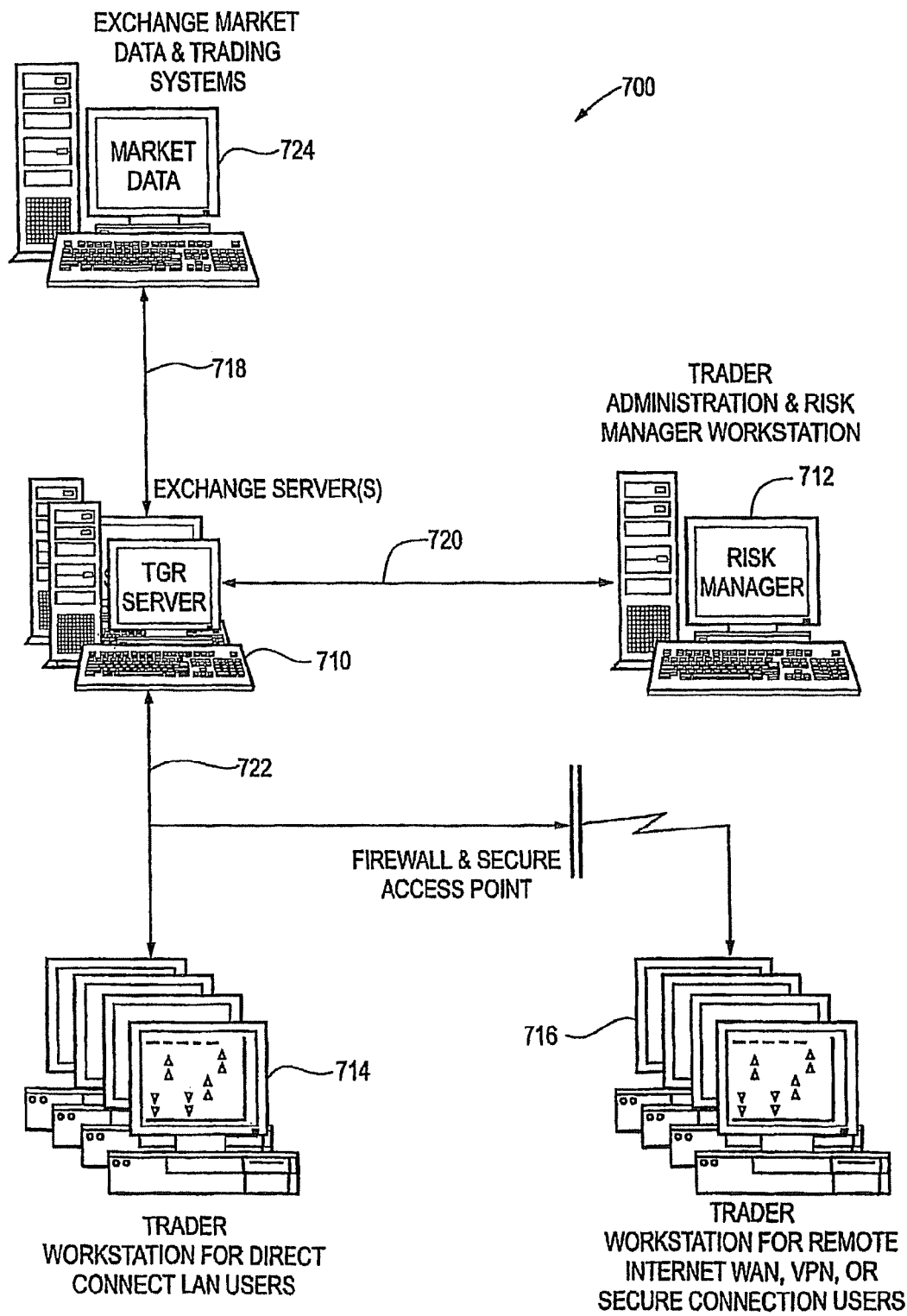
FIG. 7 is a block diagram depicting an overview of a system 700 for analyzing and displaying security trade transactions constructed according to an aspect of the present invention.

FIG. 7 is a block diagram depicting an overview of a system 700, constructed according to an aspect of the present invention, for analyzing and displaying security trade transactions, and for receiving from a user security trade orders. The system 700 comprises at least one exchange server 710, at least one trader administration and risk manager workstation 712 coupled to the exchange server 710, at least one trader workstation 714, 716 also coupled to the exchange server 710, appropriate software described further herein, and appropriate telecommunications and networking facilities 718, 720, 722 to allow communications among the servers and workstations. The exchange server ("Server") 710 interfaces end-users with exchange market data and order routing capabilities. The trader workstations 714, 716 are client devices that provide end-user services. The administration and risk manager workstation 712 is used to set-up trader accounts for the system, set trading controls, and to monitor trading activity. Appropriate software, described further herein, runs on the trader workstations 714, 716, and the exchange server 710.

The exchange server 710 acts as the interface between end-user traders and security exchange(s), and has two essential roles: (1) subscribing to and receiving exchange market data, including traded prices with traded volume, and current bids and offers and (2) routing end-user trading orders to exchange(s) for matching. The method described herein involves the use of said exchange market data, which the server receives from one or more exchange market data and trading systems 724 and prepares for re-transmission to the trader workstations 714, 716.

The servers and workstations may be implemented using industry-standard IBM-PC compatible computers of known design. Although these elements are referred to in the drawings and the text as separate units, one or more of them may be integrated in the same physical computer system. Although the trader workstation and exchange server is typically mentioned herein in the singular, several of each may be present. The computer software described herein may be implemented using commercially available software development tools. For example, a commercial embodiment of the invention was implemented using Microsoft C++6.0, Microsoft Visual Foxpro 7.0, and other tools. Other software development environments could also be used. The software may also make use of software application program interfaces (APIs), networking programs, and networking protocols developed or in use by other sources, including the security exchanges Chicago Board of Trade (CBOT) and Chicago Mercantile Exchange (CME).

Figure 11A:
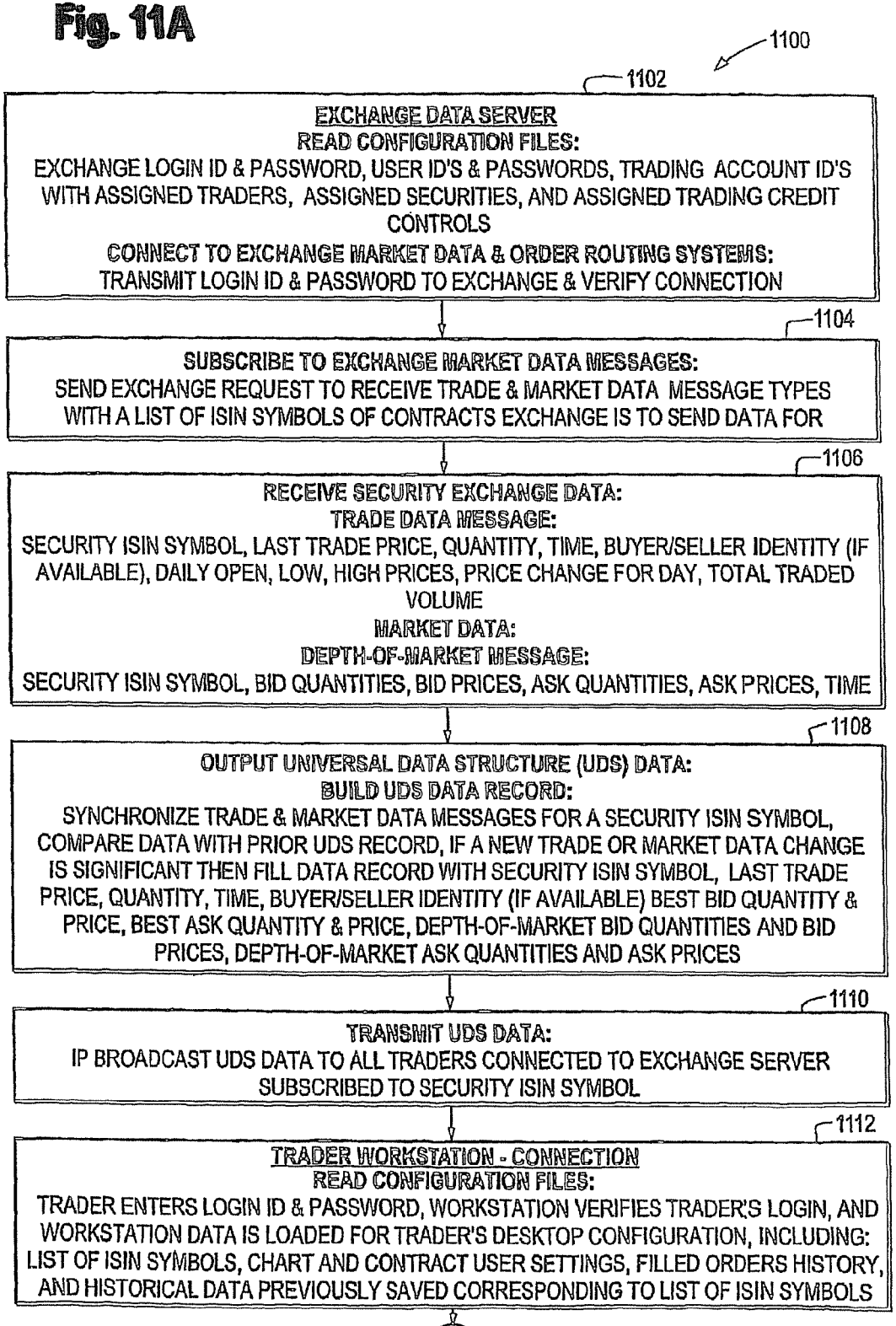
FIG. 11A is a flow diagram depicting a method 1100, for use in conjunction with the system 700 of FIG. 7, for processing transactions and displaying ticks.

FIGS. 11A-11B are a flow diagram depicting a method 1100, for use in conjunction with the system 700 of FIG. 7, for processing transactions and displaying ticks. The method 1100 includes some preparatory steps, which are performed by the exchange server, and will be discussed here.

At step 1110, in order to receive security exchange market data, the exchange server 710 logs into and is authorized to connect to the data servers 724 at security exchanges. Once connected to the data servers 724 at security exchanges, in step 1104, the server 710 then subscribes to receive selected exchange market data, and the server may also specify particular data formats to receive if an exchange transmits data in multiple different formats, as is usually the case. For example, to receive market data from the Chicago Mercantile Exchange (CME), the Server logs in with a user identification and password issued by the exchange and then transmits to the exchange a subscription command that specifies which futures contracts and which market data record types the security exchange servers should send to the exchange server 710.

Because exchanges provide market data in multiple different formats, or message types, which are transmitted simultaneously to the exchange server 710, the exchange server must recognize the different message types as they are received and then process the data provided by the exchange. For example, the server 710 may subscribe via the Chicago Mercantile Exchange to the popular S&P 500 E-Mini futures contract for a given expiration month and then also specify to receive two different data messages for the contract, one that sends updates for the last executed trades and another data message that sends updates for the current book of bid/ask orders used for depth-of-market information. In step 1106, the exchange server 710 then begins receiving the data sent from the security exchange servers 724 and extracts the data elements required by the trader workstation 714 to construct the market data "TICKFLOW" chart (see FIG. 8) according to the steps of method 1100 described further.

One of the tasks of exchange server 710 is to format the multiple message types of incoming security exchange market data into one standard data record before sending the data to trader workstation 714 (step 1108). Because exchange server 710 formats all security exchange market data into one standard format, called a Universal Data Structure, or UDS, the trader workstation 714 can process the data according to the method herein regardless of how many different data messages were originally processed, the timing of the incoming market data messages, or because of any other differences between how each security exchange provides and formats market data. The last point is important when considering that there are significant differences between the way market data is provided, for example, by the Chicago Board of Trade (CBOT), the German exchange EUREX, and the CME. In the case of the CBOT and EUREX market data feeds, the market data quantities and prices are summarized and updated every few seconds. The CME can send an update message for every executed trade and change to the bid/ask depth-of-market, creating a huge message flow to the exchange server 710 for popular futures contracts like the S&P 500 E-Mini. Although security exchanges transmit market data in different intervals, the exchange server 710 is adapted to logically synchronize bid/ask depth-of-market data with last executed trade data to create one resulting data structure, the UDS. By carefully synchronizing market data regardless of which security exchange the exchange server 710 is connected to, the trader workstation 714 software using the UDS data is able to make an accurate analysis when comparing the last trade price with bid/ask depth-of-market prices, and assign appropriate icons to be charted for showing buyer and seller orders using the method 1100, as further described.

The UDS data structure preferably includes all of the data elements required, including the price, volume and time of the last executed trade, and the total order quantities for up to 10 bid and 10 ask prices for depth-of-market. The UDS also preferably contains the lowest and highest trade prices for the day, the change in price since the beginning of day, and when provided by the exchange, the identifier of the buying and selling parties of the last executed trade.

Once the UDS structure is built from the various security exchange market data messages, in step 1110, the exchange server 710 transmits the UDS record to all trader workstations 714 that have subscribed to the market data provided by the UDS. The exchange server 710 transmission uses standard Internet Protocol, or IP, to deliver the UDS data to the Client, which may be connected on a local area network (LAN), a wide area network (WAN), a virtual private network (VPN), and/or through an Internet service provider (ISP) (all shown collectively as 722 (FIG. 6)). Although the exchange server 710 and trader workstation 714 are depicted as separate units, their functions may be integrated in a single computer system.

In sum, the exchange server 710 is a high performance router of information, taking thousands and up to millions of messages from security exchanges each trading day, repackaging the incoming data into UDS data structures, and forwarding the market data to appropriate trader workstation 714. It is critical that the exchange server 710 not lose incoming market data while repackaging the data for transmission to trader workstation 714, and as such, the exchange server contains additional logic to temporarily hold, or buffer, incoming market data in a queue which is then processed into the UDS structures. In some instances, the exchange server 710 may preferably refrain from re-transmitting the market data in an effort to improve efficiency, if the only change in the new UDS record would be a relatively minor change in the order quantities found in the bid/ask depth-of-market data. However, in almost all other cases, the exchange server 710 does build a new UDS record for transmission to trader workstations 714, particularly if a new trade is executed, or if a new price point is established for the bid/ask depth-of-market orders.

The trader workstation 714 or "client" provides an interface to enable the end user to interact with the system. An end user, or trader, may use the system by starting the program. In step 1112, the system prompts the user for a user identification and password. One or more exchange servers 710 may be designated for each security exchange. In FIG. 1114, after the trader workstation 714 software begins operation and a trader's identification is verified, the trader workstation 714 subscribes to exchange server 710 by sending a message to each such server 710 containing a list of securities the trader workstation 714 wants the exchange server 710 to send market data for. The exchange server 710 verifies if the trader using the trader workstation 714 software is entitled to receive the market data for the requested securities based on a list of securities established by a TradeGraph System Administrator. The exchange server 710' then begins transmitting market data for the authorized list of securities to the trader workstation 714.

The trader workstation 714 is able to save market data previously received from the exchange server 710, and if saved data is found corresponding to the same securities being actively subscribed to, the trader workstation 714 will load the historical data first and then begin processing of the current real-time market data coming from the exchange server 710. To facilitate matching historical data with current data, historical data files must follow a naming convention that includes the symbol for the security. If historical data is found, the trader workstation 714 will append the new, current market data to the end of the previously saved historical data, and display both the historical and current data to create a continuous chart of data over the period of time for which data is available for, up to a maximum setting based on the capacity of the trader workstation 714 program to hold data in active memory for rapid display.

Once the preparatory steps have been completed, the system is ready for displaying security transaction information. In step 1116, the trader workstation 714 receives a Universal Data Structure (UDS) that contains market and trade data from exchange server 710. Once a UDS record is received, the trader workstation 714 processes the new data by first checking to see if the new UDS record contains data for a new trade, or just a change in depth-of-market (DOM) prices and/or quantities. In step 1118, the system determines if the UDS record contains a new trade, the value of the trade volume is greater than zero, and the value of the total volume traded for the day is greater than the value of the total volume traded from the previously received UDS record. If the result of step 1118 is affirmative, then in step 1120, the UDS data is then evaluated to determine if a buyer or seller initiates a trade, or if no order initiation type can be assigned. To assign order initiation to the trade, the trade price is compared to the bid/ask prices of the most recent UDS received before the current UDS, under the assumption that the DOM data that existed at the time of the current trade is correctly held in the prior UDS, and that the DOM data in the current UDS may have already changed subsequent to the current trade.

As a technical note, electronic exchanges generally process trade orders sequentially on a first-come first-serve basis. However, the transmission of current market data prices, including the data for the most recent trade and the current DOM may occur as parallel processes with the exchange sending one data message for last trade data and a separate data message with DOM data, such that each data message is not necessarily perfectly synchronized or exactly associated with the other. Thus, it is up to the practitioner to review exchange market data message transmission documentation and methods to best determine if a trade price should be compared to the DOM data of a prior UDS or the current UDS to properly reflect the market state at the time just preceding the actual trade.

The process of evaluating a trade to determine whether it was buyer or seller initiated is shown in step 1120. If the current trade price is equal to or greater than the best ask price of the previous UDS, then the trade is assigned as buyer initiated. If the trade price is equal to or less than the best bid price of the previous UDS, then the trade is assigned as seller initiated. If the trade price falls between the best ask and best bid prices, then trade initiation is considered to be unknown. This occurs when an inbound bid matches an inbound offer before being posted in the depth-of-market.

Once trade order initiation is assigned, then in step 1122, an iconic representation for the trade can be determined. For example, an upward triangle, arrow, or similar iconic shape may preferably be used for orders initiated as buys, and a downward triangle, arrow, or similar iconic shape may preferably used for orders initiated as sells, and a diamond, circle, or similar iconic shape may preferably be used for undetermined order initiation. Other shapes and indicia may also be used. Further, an appropriate distinguishing color may be assigned, depending on order initiation, to reinforce the information provided by the iconic shape, thereby further aiding in distinguishing among buyer-initiated, seller-initiated, and neutral ticks. Generally, orders initiated as buys are displayed in blue or green, and orders initiated as sells are displayed in red hues.

According to a further aspect of the present invention, an indicia may be applied to the display of a trader's own transactions to distinguish them from other executed orders on the display. For example, the system may preferably draw a circle around the triangle used to depict the 'tick' associated with a trader's own trades. The feature of adding distinctive indicia is not limited only to the aforementioned attributes for assigning iconic symbols to transactions. A variety of other treatments may be used to expand the compound capability of iconic representation for attributes. For example, the triangle icon may be modified with lines, dots, numbers or other markings to indicate exact order amounts and buyer and seller identities when security exchanges make such information available.

Thus, as shown in step 1124, other transaction parameters may preferably be used to determine additional attributes for the iconic representation. For example, the iconic shape may be filled, shaded, hatched, its line width may vary, or it may otherwise be given a distinctive appearance depending on the volume of a trade. This further enhances the information content of the iconic representation of the trade. Smaller trade quantities are displayed with unfilled iconic shapes, and larger trades are displayed with filled or patterned iconic shapes. Furthermore, if it can be determined that the trade is the result of an order just filled for the trader, the iconic representation of the trade can be highlighted by placing a circle or box around the icon, or distinguishing the icon through other display mechanisms such as using a different foreground or background color, or using a bolder, brighter or flashing presentation.

In step 1136, the iconic shape assigned to the current trade may be plotted on a chart that has price on the vertical axis and time on the horizontal axis, with the shape placed on the chart co-linear with the price of the trade. According to a first exemplary embodiment of the present invention, the trade may be plotted following previously plotted trades in a sequential order. According to a second exemplary embodiment of the present invention, the trade may be plotted according to a process whereby trades are grouped into auctions, as described below in greater detail in connection with steps 1126-1134. When trades are grouped into auctions, the horizontal axis represents time in a modified sense—that is, auctions are plotted left-to-right in time order, but within a single auction, the left-to-right order of plotted transactions conveys no information regarding the time at which the transactions occurred.

Figure 13A:
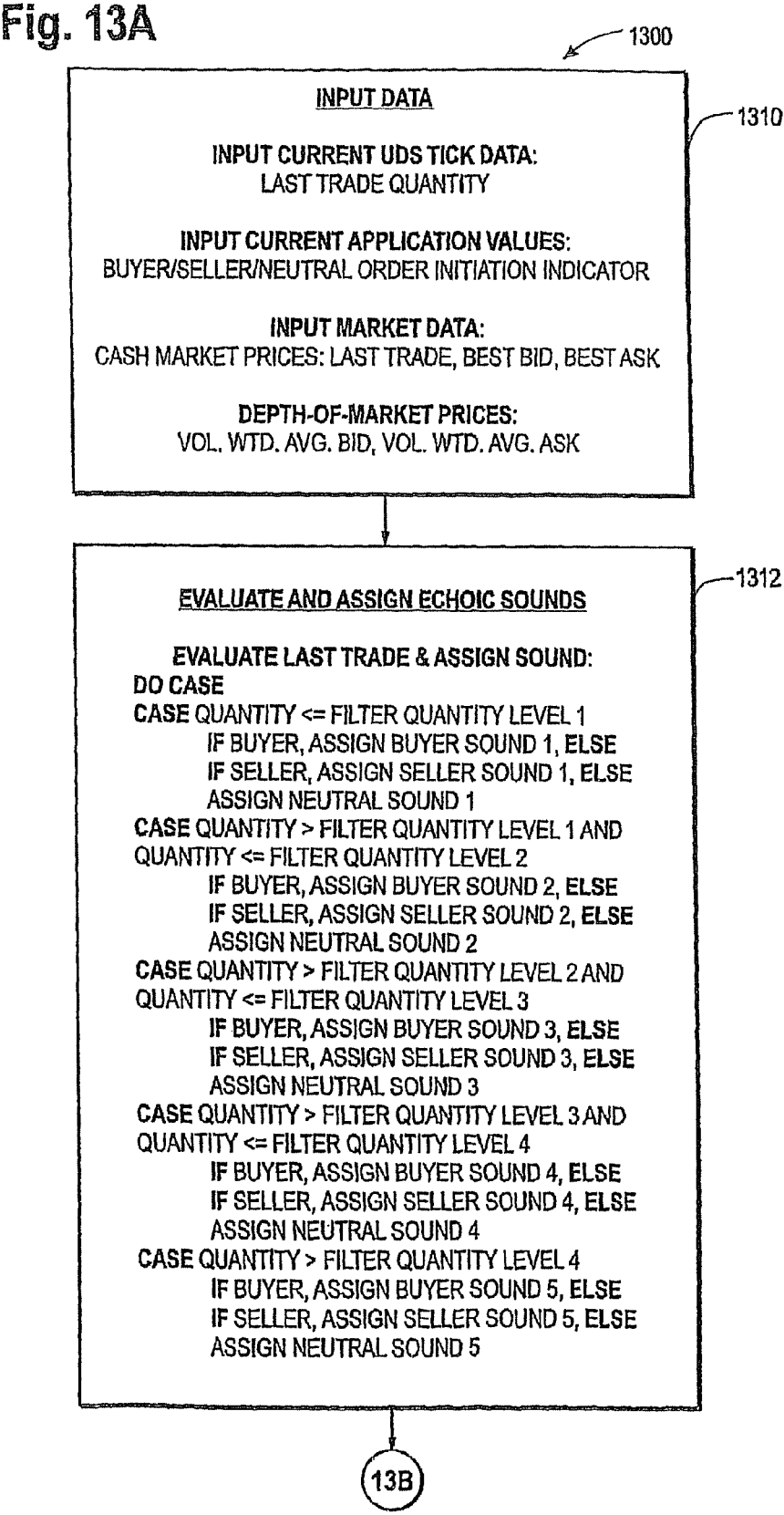

According to a further aspect of the invention, as a trade is plotted, an echoic, or sound, representation may be assigned to the trade as an additional way to represent the exchange. FIG. 13 is a flow diagram depicting a process 1300, for use in conjunction with the system 700 of FIG. 7, for assigning echoic sounds to transactions. In step 1310, attributes of a trade are provided to the echoic representation process to establish a filter to assign a sound to a trade. In step 1312, the trader workstation 714 evaluates the input data and assigns different user specified sounds based on the size of a trade order and whether or not order initiation was by a buyer, seller, or was undetermined. Similar filters can be set in the system to evaluate cash market trades (i.e., where the item being traded using the system is a derivative instrument, events in the cash market for the underlying security may be used to generate different sounds). The evaluation of cash market events, and assigning sounds in response thereto, is handled in step 1314. In addition, filters can be set in the system to evaluate average ask and bid prices in the depth-of-market information to assign echoic representations to activity that may affect trading in the primary market. The evaluation of depth-of-market information and events, and assigning sounds thereto, is handled in step 1316.

Echoic sounds may be defined by pitch, duration, or other characteristics, and sounds may be combined to be intoned quickly one alter another to signal a trader that trades of a certain size and/or order initiation type are occurring without the requirement of viewing the visual display showing the chart of trading activity. Echoic representations can also include playback of sound messages as may be assigned to describe trade data attributes.

Echoic, or sound-based representations of trading data also provide a compelling communication additive to help traders sense market intensity, similar to trading in the live auction pits still used in futures trading. As with visual icons, echoic representations offer a variety of options, from fairly rapid single and multi-tone sounds to periodic playback of sound recordings or text-to-speech. Preferably, sound tones may be set by a trader to be played when transaction quantities reach various levels, differentiated by buyers and sellers, according to the logic shown in FIG. 13. These sound tones can be set as single or multi-toned, and the pitch and duration of each tone can be individually set for different quantity levels traded or various other criteria. By varying pitch, duration and tone combinations, traders can listen for new buy or sell trades/orders and actually hear the difference between larger and smaller trades/orders and more or less trading activity. When trade sizes increase, the sounds indicate the direction and magnitude of liquidity absorption and reinforce the visual cues provided by the iconic representation of the transactions. Together, iconic and echoic representations provide significant improvement in the level of communications a trader receives from a trading and display system.

A first display product produced by the method 1100 of FIG. 11 is the TICKFLOW chart 800 of FIG. 8. The TICK-FLOW chart 800 is a significant improvement over the prior art in that it allows the trader to perform detailed observation and digitization of the naturally expressed exchange process in which buyers and sellers discover mutually acceptable prices to consummate transactions. Real-time market and trading data from security exchanges are processed by the system 700 to immediately display price and volume, and includes the interpretation that virtually all transactions are either initiated as buy orders or sell orders. An iconic representation for each transaction clearly indicates, without regard for color-coding, if market transactions originate from buyers or sellers.

As best seen in FIG. 8, the TICKFLOW chart display 800 indicates the prices of recent transactions, the size of such transactions, and whether such transactions are deemed to be buyer-initiated or seller initiated. The security exchange trading and market information is processed and displayed as a continuously updated chart 800 that plots each trade at the price traded and for each plot point shows: a triangle, arrow, or similar shape pointed up (e.g., 810) to indicate a trade initiated by a buyer; a triangle, arrow or similar shape pointed down (e.g. 812) to indicate a trade initiated by a seller; and a circle, diamond, or other shape (not shown), to indicate a trade if buy/sell order origination is not determined.

The importance of discriminating between buyer-initiated and seller-initiated transactions arises from the directionally biased impact those types of transactions have on price. In general, when a trader wants to buy or sell a security immediately, the trader views the bid/ask book, or depth-of-market. Securities offered for sale have an ask price. Securities sought for purchase have a bid price. If the trader wants to buy a security immediately, the trader can buy at the ask price (the "ask"). Such a transaction is considered buyer-initiated, and results in a plot on the chart that is represented by an upward triangle 810. The upward triangle is symbolic of the fact that buying pressure tends to drive prices up. If the trader owns a security and would like to sell it immediately, the trader can sell at the bid price (the "bid"). That transaction results in a plot on the chart that is represented by a downward triangle 812. The downward triangle is symbolic of the fact that selling pressure tends to drive prices down. It is participants with an immediate need to buy or sell that cause the market to adjust the trading price to maintain equilibrium between buyers and sellers.

The TICKFLOW chart 800 displays depth-of-market in the form of columns adjacent to and tabularly aligned with the price axis of the chart. A first column 824, lists the total number of contracts bid or ask at the adjacent price displayed on the chart's price axis. A second column 822 indicates the bid/ask price. The highest bid price and the lowest ask prices are considered to be the 'best' bid price 820 and 'best' ask price 818 respectively. A trader can view the depth-of market and determine if there are few or many contracts at the bid or ask prices. If a trader places an order, and depending on the quantity of the order, the order may be only partially filled at the best price, and the remainder filled at the next price, and so on, until the total quantity of an order is matched for the transaction according to the quantities and prices listed in the depth of-market.

Listing, in the TICKFLOW chart display, the depth-of-market directly next to and sharing the vertical price axis of the chart is a significant improvement over prior art display systems. By placing the depth-of-market next to the vertical axis, the depth-of-market prices actually form an integral part of the labeling of the vertical price axis. As trades are plotted, the most recent trade price is indicated at 815, and the security product symbol is indicated at 826. As market prices vary, the depth-of-market display moves up and down along the vertical axis to correspond to changes in bid/ask prices and the plotting of transactions. Prior art security charts do not integrate the depth-of-market with a graphical transaction display, but instead provide depth-of-market information in a separate window where the depth-of-market values are listed in a tabular report (see FIG. 5). By integrating the depth-of-market with the security chart, traders can easily see if orders are transacted at the bid or ask prices, as well as observe changes in the depth-of-market quantities over the price range indicating relative liquidity over the price scale. The difference between the 'best' bid price 814 and the 'best' ask price 818 is called the spread. Securities that are heavily traded tend to have very narrow spreads, but securities that are lightly traded can have spreads that are significant, and a gap will appear in the depth-of-market display between the 'best' bid price and the 'best' ask price.

The width of the spread is indicative of a security's liquidity. If the spread is small and the depth-of-market continuously shows quantities of buy and sell orders greater than the average size of executed trades, the market is liquid and investors are willing to buy or sell a security at any time. If the spread is large, or quantities in the depth-of-market are small compared to transaction sizes, then the market is not as liquid and buyers and sellers are probably scarce or unwilling to trade. The spread is important to market makers and specialists (depending on the exchange) that buy securities from the public at the bid price and sell securities to the public at the ask price, thereby profiting from the difference in the bid and ask prices. The spread is also important to traders who must realize a change in the price greater than the spread to exit a position profitably. By displaying the depth-of-market along the price axis of the tick chart, the system disclosed herein improves on prior systems by allowing traders to visually assess the width of the spread and assess market liquidity for a security relative to market trading activity.

Moreover, as trades are plotted on the chart, a trader can conclude that buyers initiate most of the trades if the majority of the iconic shapes are pointed up, and conversely, the trader can conclude that sellers initiate most of the trades if the majority of the iconic shapes are pointed down. Also, if most of the iconic shapes are darker, filled in shapes, then a trader can see trade quantities which are higher and notice that participation within the exchange security trading, is increased, which tends to re-enforce the depicted price trend.

A trader can also watch the quantities in the depth-of-market listed at the side of the chart and see if the quantities corresponding to the ask prices are reduced if most of the orders are from buyers as buyers deplete the securities offered for sale. Similarly, a trader can observe if the quantities corresponding to bid prices are reduced if most of the orders are from sellers. As the quantities in the depth-of-market change in response to how orders are initiated by buyers or by sellers in the exchange process, and as exposed by the iconic presentation of the present system, a trader can see how the equilibrium of supply and demand for a security may change, and how new price points for transactions may be set as traders discover whether the market is composed more by initiating buyers or sellers at a current price point. The system of the present invention allows a trader to quickly see, and optionally hear, if big buyers support the market, or big sellers are applying downward pressure. This is a significant advantage during rapid real-time electronic trading.

Once a trade is evaluated and assigned iconic and echoic representations, the iconic shapes are displayed and echoic sounds intoned or played through speakers. A basic process of displaying the iconic shapes has been described earlier, wherein each trade is plotted in sequential order following prior trades. According to a further aspect of the present invention, sequential trades may be organized into groups called auction events, which are established using filter criteria. Before discussing the mechanism by which the system organizes trades into auction events, it may be helpful to consider the relevance of auctions in security trading.

The auction mechanism used by exchanges has traditionally involved face-to-face meetings of parties, for example at specialist posts at the New York Stock Exchange (NYSE) or in trading pits at the Chicago Board of Trade (CBOT) or Chicago Mercantile Exchange (CME), where traders act as, or represent, buyers and sellers of securities, indicating to each other how much and at what price they will trade a security. In the traditional auction process, each trader can see if other traders are buying or selling and who is making the best offer to buy or the best offer to sell. Trading usually varies in intensity during a given trading day as traders establish price points and subsequently execute trading orders around said price points. Each such group of trades may be logically grouped and considered to be an auction event within the trading day. An auction event, or series of trades around a price point, register elapsed times which vary randomly from a few tens of seconds to a few hours dependant on participant activity, before a significant change in price point is discovered and a new auction event starts. In the course of a trading day many short auctions can occur in the continuing process of making a market and balancing supply and demand for a security.

The advent of automation with computers and electronic communication networks has increased the speed with which exchanges are able to match buyers and sellers of a security. Examples of exchange automation include the National Association of Securities Dealers Automated Quotation System (NASDAQ), the Globex system used by the Chicago Mercantile Exchange (CME), and the a/c/e system used by the Chicago Board of Trade (CBOT). In automated exchanges, orders are posted electronically and filled when the price of buy and sell orders match, or at the best available price for orders entered as market orders. The matching process is still an auction involving price discovery and trade execution, however, electronic auctions are not face-to-face in the traditional sense and the identity of buyers and sellers, as well as the actual number of buyers and sellers, may not be known or readily apparent. It is up to an exchange system to make information available about the parties buying and selling and the source of actual trades, and other than identifying market makers in the NASDAQ Level II system, exchanges generally do not identify buyer or seller information, but report only on the quantity and price of a trade and the current prices bid or offered.

As best seen in FIG. 8, according to a further aspect of the present invention, system 700 may filter sequential trades into auction groups such as group 828. A color bar along the bottom axis of the TICKFLOW chart 800 indicates which transactions are part of one logical auction event. Within an auction event, each triangular icon representing a transaction, or 'tick', is plotted across from the price at which the transaction is executed in the left-most available column within the auction for the price. If previous icons already use all of the plot space within an auction for a given price, then the auction is expanded to the right to add a new column space for the current transaction icon. Unlike prior art tick chart systems that plot each sequential tick in front of a previously plotted tick, the preferred embodiment specified herein will plot the current tick over or under a previously plotted tick as long as the auction event continues, and a column 830 in the auction is available for the transaction price.

Before each transaction is plotted, filter criteria are tested to determine if the current transaction, or tick, satisfies the criteria to start a new auction. The goal of the auction event filter criteria is to group sequential transactions based on the measures of supply and demand, including the variables price, quantity, sequential direction and whether orders are initiated as buy or sell transactions. The method of applying the filter criteria to determine whether a transaction is part of a new auction event is depicted in FIG. 11B, steps 1126-1136, described further below. By using a filter to group transactions into auction events, traders can observe clusters of trading activity instead of focusing on the purely sequential timing of non-descriptive transactions. This is a significant advance over prior art, including the point-and-figure charting method of FIG. 4, which only checks for a change in price direction of some minimum number of price increments to separate groups of trades.

By creating auction events to logically group sets of transactions, system 700 is able to create a display that, to the extent currently possible given the limitations of computer displays, simulates the quality and quantity of information a trader could observe if the trader were standing in an open outcry trading pit, or post, and interacting with other traders directly. Each auction is, in effect, the presentation of the action that would otherwise occur in a trading pit for whatever length of time is necessary to consummate the fulfillment of a series of trade orders at a given level of supply and demand, and before a new equilibrium point, or "fair" price, is determined from which a new auction will eventually originate. By effectively simulating the open outcry trading pit, the system described herein offers great utility to traders who are used to the sensory input of personal interaction to detect changes in supply and demand, and who otherwise have difficulty using prior art electronic trading systems that either depend on historical, time-based technical studies, or grids of numbers with no graphic image, to establish supply/demand reference points.

According to an aspect of the present invention, an auction event is defined by criteria that specify the number of consecutive trades of the same order initiation type within the auction group, or a trade with a quantity greater than a predetermined size that is coincident with a change in price of a specified magnitude, or other auction criteria as may be applied. The auction criteria is designed so that a user can modify the filter values according to the market being traded in order to identify clusters or groups of trades that represent short logical auction events during the otherwise continuous stream of transactions.

The assumption of the above criteria is that if enough trades occur sequentially of one type of order initiation, then such a constant stream of orders initiated by buyers or initiated by sellers indicates a directional bias in trading, and ultimately, will cause a consequent upward or downward price trend. In the second scenario, a large trade at a new higher or lower price point indicates a willingness on the part of the order initiator to establish a new price and essentially force other market participants to concur.

Referring now to FIG. 6, steps 1126-1136 are used to determine whether a particular trade begins a new auction or is added to an existing auction. In steps 1126 and 1128, a transaction is tested against two auction event criteria. A first criterion determines whether the trade is the Nth consecutive trade of the same order initiation type is greater than or equal to the filter value for some number of consecutive buyer, seller, or unknown trades (as selected by the user), then the test continues to a second criterion. If not, control jumps to step 1136. In the second criterion test, if the trade quantity is greater than or equal to the filter quantity, or there has been a price change since the prior Universal Data Structure was received, then a new auction event is started, and the icon corresponding to the current trade is plotted in the new auction.

Although step 1126 is described herein as employing two separate criteria tests to determine the end of one auction event and the beginning of another auction event, any number of criteria could be used, as appropriate to effect the result of grouping trades into logical market events associated with factors of supply and demand. Moreover, although the filter criteria described in connection with step 1126 are believed to be useful in identifying the boundaries of auction events, different criteria could also be used.

In step 1130, if a trade does not cause the beginning of a new auction event, then control jumps to step 1136, where the trade is plotted at the first available space in the current auction event that corresponds to the price level of the trade. Thereafter, control jumps to step 1138, and if echoic sound facilities are implemented, method 1300 of FIG. 13 (described earlier) is invoked, wherein an echoic representation is assigned to the trade.

If, in steps 1126 and 1128, a trade is evaluated as the beginning of a new auction event, and the criteria used. is the number of sequential trades of the same order initiation type, then a special process is begun to complete the previous auction event. In that case, step 1130 is executed and prior trades are reviewed as in step 1130 to determine if they should remain in the previous auction event, or should be included at the beginning of the new auction event with the current trade. For example, if auction event filter criteria is set to ten consecutive trades of the same order initiation type and the current trade is the tenth consecutive order initiated by a buyer, then the nine previous trades that make up part of the sequence of trades that determined the beginning of a new auction event are moved into the new auction event along with the current trade.

If a new auction event is started because the criteria used is a large trade at a new higher or lower price point, then the current trade will be the first trade of the new auction event and all prior trades remain in the preceding auction event.

Figure 12A:
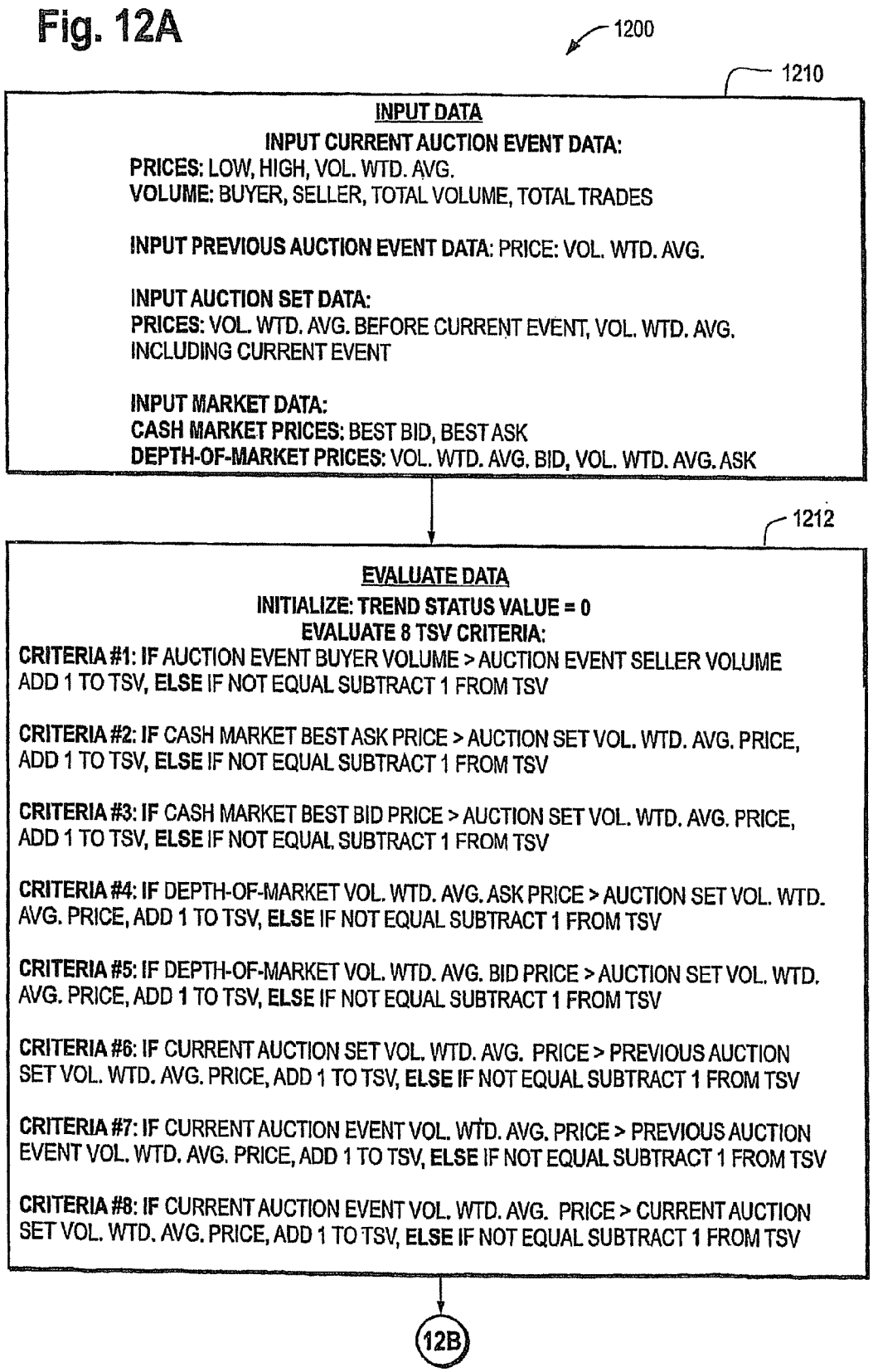
FIGS. 12A and 12B are a flow diagram depicting a process 1200, for use in conjunction with the system 700 of FIG. 7, for assigning trend status values to auction events.
Figure 12B:
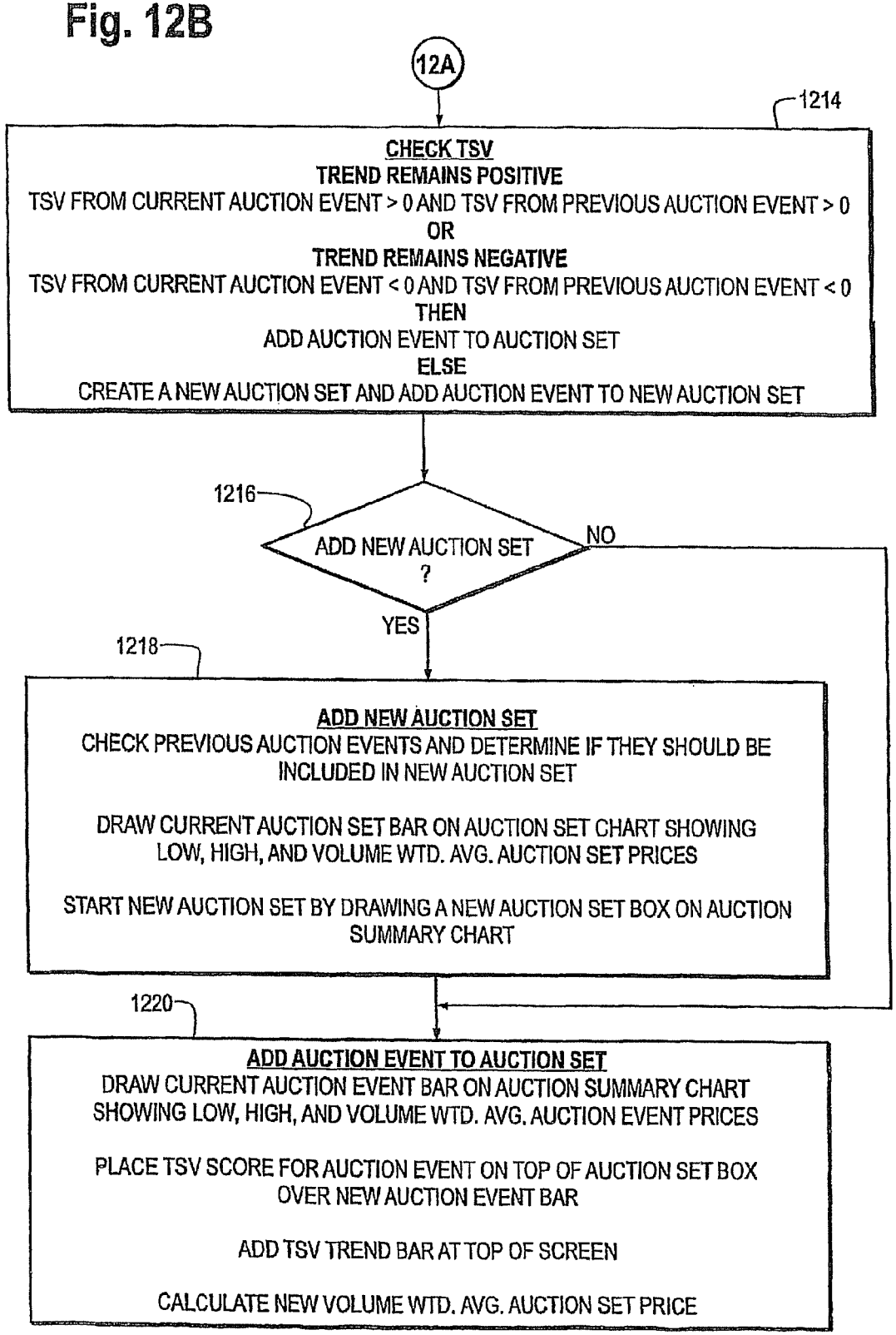

In step 1132, once all trades are determined for a completed auction event, then statistics kept for the just completed auction event are calculated, including total quantity traded and the high, low and volume weighted average prices of the auction. The process 1200 of determining trend status values and other statistics for an auction event is shown in FIG. 12 and described further in greater detail. Totals are also calculated for the quantity traded during the auction event based on orders initiated by buyers and the quantity traded based on orders initiated by sellers. In step 1134, if the quantity traded by buyers was greater than the quantity traded by sellers, then the auction event is coded with a horizontal bar (e.g. 830) of a first color (e.g., blue) at the bottom of the TICKFLOW chart 800. If the quantity traded by sellers was greater than the quantity traded by buyers, then the auction event is coded with a horizontal bar of a second color (e.g. red) at the bottom of the TICKFLOW chart. At the same time, a blue or red colored vertical bar 910 is drawn on the auction chart (see FIG. 9).

Once a trade has been evaluated and determined to be part of a new auction event, and the subsequent evaluation is made using the Trend Status Value (TSV) score, defined further below, to determine if a completed auction event should be included in a current or new auction set, the trade is processed (step 1134) as part of a the new auction event that is indicated with a time stamp 828 and a horizontal bar 832 along the bottom of the TICKFLOW chart 800 (FIG. 8).

According to a further aspect of the present invention, auction events may be plotted in an auction summary chart 900 (FIG. 9) and an auction set chart 1000 (FIG. 10). The auction summary chart 900 uses a bar chart format where every bar 910 indicates the price range of each auction event, and the dot 912 on the auction bar indicates the volume weighted average price (VWAP) determined for each auction. Once each auction event ends, a filter processes statistics derived from the auction event and a score, called a Trend Status Value (TSV) 914, is calculated in accord with method 1200 (see FIG. 12) and assigned to the auction and noted above the box 918 drawn over the auction bar. If the TSV score is positive, it is displayed as a number in a first color (e.g., blue) that indicates demand is greater than supply, indicating support for an upward trend. If the TSV score is negative, it is displayed as a number in a second color (e.g., red) that indicates supply is greater than demand, indicating pressure for a downward trend. Higher scores indicate a stronger imbalance of supply and demand, thereby creating an upward or downward trend in prices. A TSV score of zero (0) indicates supply and demand is in balance and no price trend is apparent. The TSV scores are also graphically displayed as small bars 916 at the top of the auction summary chart, making it easy for traders to detect the strength, direction and reversal of price change trends.

Auction events are grouped into sets based on TSV scores. Generally, auction sets are determined when sequential TSV scores assigned to auction events change from negative to positive, or from positive to negative. Auction sets, as displayed on the auction summary chart, have lines drawn around them to form a box 918. For each auction set, a volume weighted average price (VWAP) is determined, which is indicated as a line 920 drawn across the auction bars used in the calculation, and as also displayed on the TICKFLOW chart 814 (FIG. 8). Multiple volume weighted average prices can be determined for one set of auctions if the trend of an auction persists and prices change from the auction set origination price, by more than a user specified filter amount. The volume weighted average price calculation is the best indicator for traders to use when determining the price point where most of the trading happens within an auction set.

The auction set chart 1000 (FIG. 10) summarizes sets of auction events, thereby providing a longer-term view of market trends. Traders use the auction set chart to view trading auctions that span minutes, hours, days and weeks.

FIG. 12 is a flow diagram depicting a process 1200, for use in conjunction with the system 700 of FIG. 7, for assigning trend status values to auction events. In step 1210, the current auction event is evaluated to determine if the completed auction event indicates support for a positive, upward trend, or indicates pressure for a negative, downward trend in exchange security prices. Summary trading statistics of market data and auctions as are used as input data for this step. In step 1212, the auction event data is evaluated. The evaluation is based on a process using multiple filter criteria to determine a Trend Status Value (TSV), or score. The TSV score uses comparison logic to assign a value of −1 to outputs which evaluate to less than a reference and a value of 1 to outputs which evaluate to greater than a reference, and zero (0) for results which are equal to a reference, for each criteria test applied in the filter, and then sums the individual values from the criteria tests to equal the final TSV. All criteria are thereby given equal weight in the final TSV score.

Positive criteria values are associated with a criteria test indicating upward price pressure and negative criteria values are associated with a criteria test indicating downward price pressure. The highest TSV score is achieved when all criteria are evaluated to indicate upward price support, and the lowest TSV score is achieved when all criteria are evaluated to indicate downward price pressure.

The greater the absolute value of the TSV scores the more significant the indication is for current upward or downward price pressure, a powerful and useful tool for traders trying to anticipate trading activity. Because both negative and positive values are assigned, it is possible to obtain a TSV score of zero, meaning neither positive or negative price change is indicated and the market is currently trading within a relatively tight price range with low current profit opportunity.

The following is a description of each of the criteria evaluated to assign the TSV score:

The first criteria (TSV1) tested checks whether or not more of the trading volume within an auction event is from orders initiated from buyers or from orders initiated from sellers. The assumption is that the largest volume of trading is a significant factor within an auction event. This is true because as buyers take out sellers, or vice-versa, the inventory of bid and ask orders in the depth-of-market is affected, and the equilibrium of supply and demand may change, resulting in a directional change in the exchange security's price.

The second and third criteria test the best bid and best ask prices in the cash market underlying a futures market. The second criteria checks to see if the best ask price from a seller in the cash market is greater than the volume weighted average price (VWAP) of the futures trades in the current auction set, which is comprised of the sequential auction events prior to the current auction event and having similar positive or negative TSV trend scores. The third criteria checks to see if the best bid price from a buyer in the cash market is also greater than the VWAP of the futures trades in the current auction set. These tests indicate if the cash market is either above or below the VWAP of recent futures trading, as defined by the current auction set. The assumption is that prices in the futures market are tied to prices in an underlying cash market, and will follow changes in such a cash market. This criterion only makes sense when the security being traded in this process is a futures contract based on delivery of an underlying security. If this is not the case, or no cash market pricing is available, the values for this criteria test are set to zero.

The fourth and fifth criteria test the VWAP price derived from the volumes and prices for the outstanding bid and ask orders in the depth-of-market. The fourth criteria checks to see if the VWAP of the ask orders from sellers is greater than the VWAP of the trades in the current auction set. The fifth criteria checks to see if the VWAP of the bid orders from buyers is also greater than the VINAP of the trades in the current auction set. These tests indicate if the depth of-market orders are either above or below the VWAP of recent trading, as defined by the current auction set. The assumption is that the VWAP of the current auction set serves as a good benchmark price for recent trading, and if the VWAP of the bid and ask orders in the depth-ofmarket are above or below the average of recent trading prices a corresponding upward or downward directional price trend is occurring.

The sixth criterion compares the VIATAP prices from the current and previous auction sets and the seventh criterion compares the VWAP prices from the current and previous auction events. These tests indicate, on a sequential basis, that the prices of the current auction set and the current auction event are either above or below the prices of the proceeding auction set and the proceeding auction event. The assumption is that the VWAP prices of the current and prior auction set, and current and prior auction event, are directly comparable, and if the current prices are above or below the prior trading prices that this is a confirmation of a corresponding upward or downward directional price trend.

The final eighth criterion compares the VWAP price from the current auction event with the VWAP price of the current auction set. Similar to the sixth and seventh criteria tests, the assumption is that if the VWAP price of the current auction event is above or below the VWAP price of the current auction set, then the recent price point established by the auction event when compared to recent trading as defined by the current auction set is another confirmation of a corresponding upward or downward directional price trend.

In steps 1214 and 1216, once the TSV score is determined by adding together the values assigned by each criteria test, the auction event TSV is compared to the TSV for the previous auction event. If the current auction event TSV score is positive and the prior TSV score is positive, or the current auction event TSV score is negative and the prior TSV score is negative, then the current auction event is a continuation of the trend. Execution continues in step 1220, and the auction event is grouped in with the prior auction events as part of what is called an auction set. Auction sets are simply groups of consecutive auction events that have occurred since the last change in positive or negative direction of the TSV score.

If the TSV score of an auction event represents a reversal from the previous TSV auction event TSV score, such as a positive TSV score followed by a negative TSV score, then the current auction event TSV score indicates the beginning of a new auction set and a change in the directional trend based on the TSV indicator. In that case, execution continues with step 1218, and a new auction set is created.

On the auction summary chart 900 (FIG. 9), auction sets are shown with a box 918 drawn around the auction events grouped into the auction set. In the auction set box a vertical bar (e.g., 910) is drawn for each auction event in sequential order from left to right and plotted from the high to the low trade price during the auction event. A dot (e.g., 912) is placed on the auction event bar at the VWAP price point calculated for the auction event. The bar is preferably presented in a first color (such as blue), if the quantity traded initiated by buyers is greater than the quantity traded initiated by sellers. The bar is preferably presented in a second color (such as red) if the quantity traded initiated by sellers is greater than the quantity traded initiated by buyers.

Over the auction event bar and above the box drawn for the auction set is displayed the number 914 representing the TSV score, with a number in the second color indicating a negative TSV score and a number in the first color indicating a positive TSV score. The TSV score is also graphically displayed as a bar 916 at the top of the auction summary chart with positive TSV scores drawn up and negative TSV scores drawn down from a zero TSV score axis line. One or more VWAP prices may be calculated for an auction set and displayed as a horizontal line 920 drawn across the auction event bars included in the VWAP calculation. Multiple such VWAP price lines are drawn for an auction set if the price changes by more than a specified filter amount within the auction set.

Figure 1:
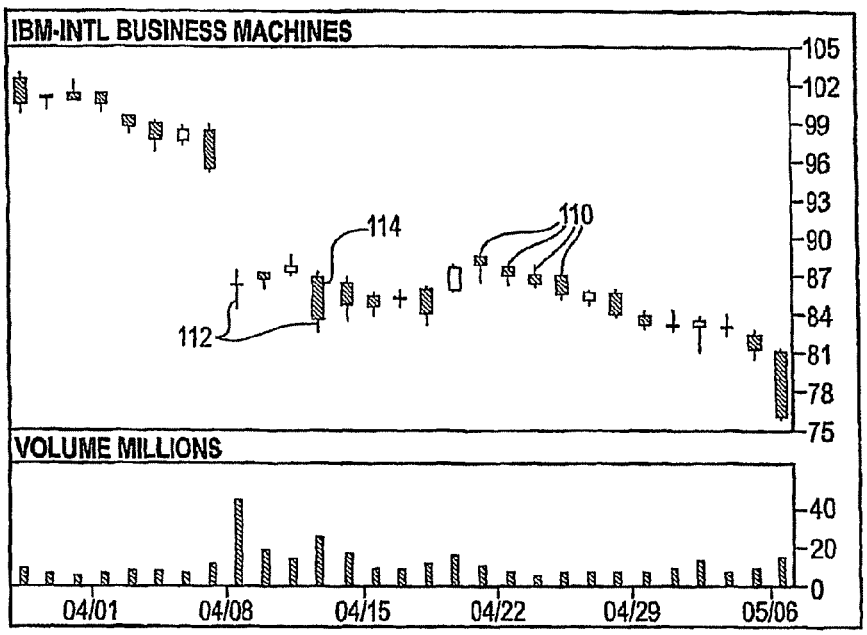
FIG. 1 is a rendition of a candlestick chart, a prior-art method of displaying historical security prices and aggregate transaction volumes.
Figure 2:
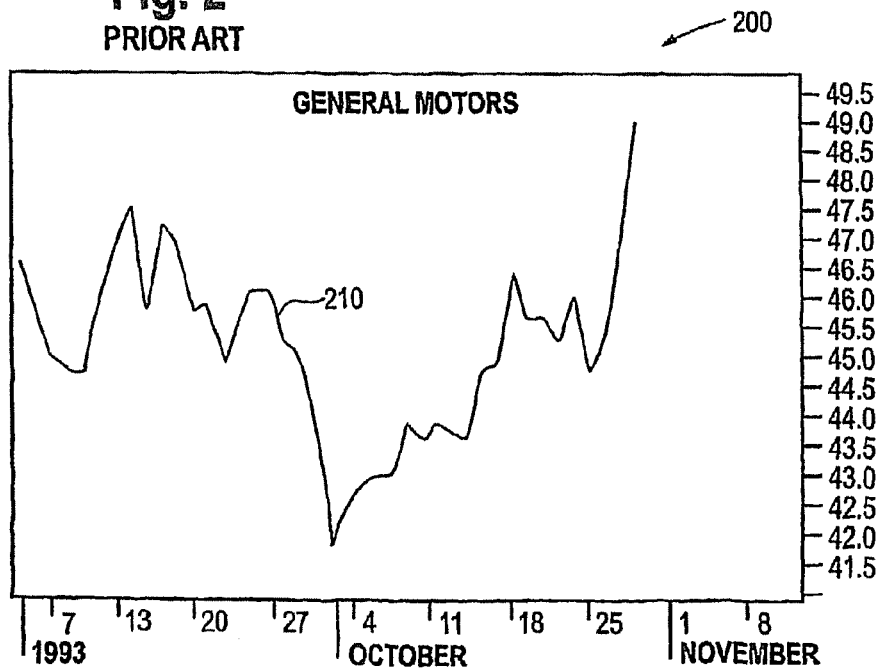
FIG. 2 is a rendition of a line chart, a prior-art method of displaying historical security prices.
Figure 3:
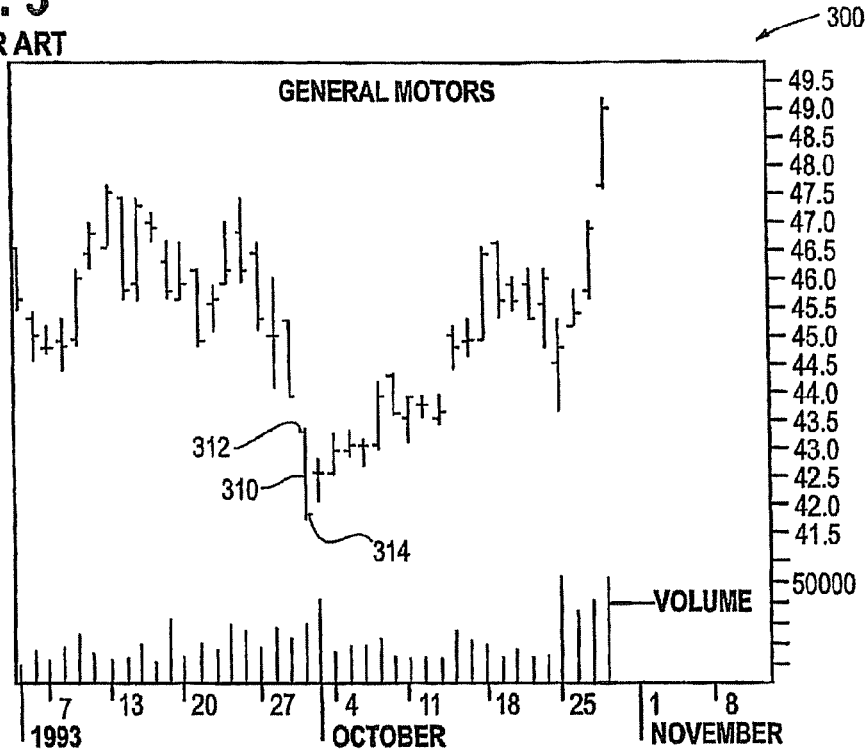
FIG. 3 is a rendition of a bar chart, a prior-art method of displaying historical security prices and ranges thereof.
Figure 4:
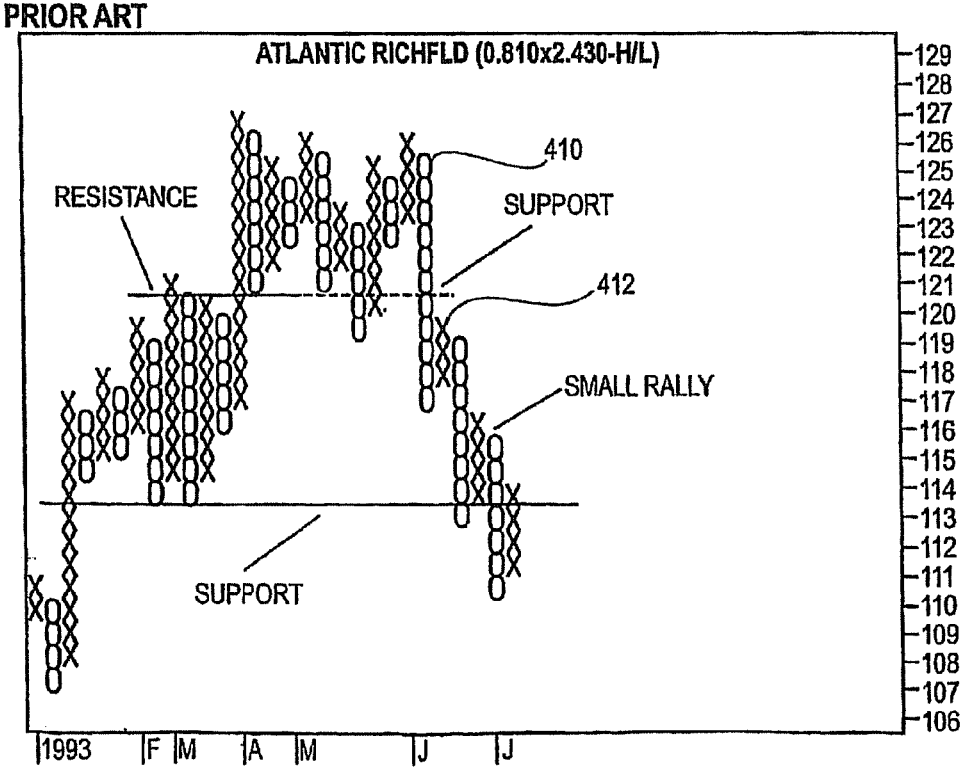
FIG. 4 is a rendition of a "point and figure" chart, a prior-art method of displaying approximate prices of a security, and trends affecting those prices.

In step 1218, when a trend reversal is detected and a new auction set started, the previous auction set is summarized and drawn as a single bar 1010 on the auction set chart 1000 (see FIG. 4). A dot 1012 is placed on the auction set bar 1010 at the VWAP price point calculated for the auction set.

The grouping of trades into auction events and the related grouping of auction events into auction sets based on the identification of TSV scores, is a powerful feature. The filtering criteria a trader can specify are adapted to flexibly adjust to different securities and different markets in order to compensate for varying levels of activity and price volatility between different markets. Once specified, the filtering criteria help the trader identify clusters of trades and expose the interaction of buyers and sellers as they make transactions in an open exchange, making it easier to detect directionally biased trading.

By reviewing the auction event summary chart 900 (FIG. 9) a trader can quickly see the duration of a positive or negative trend by the number of auction events displayed within an auction set, as indicated by the width of the boxes drawn around each auction set. If auction sets are of longer duration, then the trends represented by the auction sets are clearly the result of directionally biased trading, either up or down. Furthermore, a trader can quickly see the magnitude of a trend by the height of an auction set box, which represents the range of the price change during the trend. If the height of the auction set box, representing the price range in the auction set, is greater than average, then the auction set indicates strong directionally biased trading.

The strength of a trend, as expressed by the width and height of auction set boxes, is further defined by the TSV scores that a trader can quickly review along the tops of the boxes on the auction summary chart. If TSV scores are near zero, the strength of the trend is not strong, and conversely, if the TSV scores are near the maximum potential value, then strong directionally biased trading is occurring. The convenient bar chart representation of the TSV scores along the top of the auction summary chart clearly indicates trend strength and duration.

Equally important as identifying the strength of a price trend for anticipating future price levels is being able to note if no clear directionally biased trading is evident. This can be clearly seen on the auction summary chart 900 (FIG. 9) if many short auction set boxes are drawn, or if auction set boxes are proportionally flatter than taller. This indicates either many trend reversals are occurring rapidly, or there are minimal changes in price. Both of the proceeding scenarios offer little opportunity to identify directionally biased price trends that allow a trader to increase their probability to profit from buying low and selling high.

The auction set chart 1000 (FIG. 10) summarizes trading activity over a greater period of time and provides another view of the frequency and magnitude of trend reversals, and the cumulative result of the auction trends as represented by bars for each auction set. By examining the time stamps along the bottom of the auction set chart, a trader can evaluate the elapsed time between auction sets and see if directionally biased trends have significant duration. By viewing the height of the auction set bars and the VIATAP price point shown by the dot on the auction set bars, a trader can determine if positive trends have a greater affect on trading prices than negative trends, or vice-versa. By knowing which kind of directionally biased trends are strongest, a trader can discover whether upward or downward trends offer relatively greater trading opportunities and decide if the current trend as shown by the current auction set is a good time to make a trade.

Knowing the right time to make a trade, and knowing whether to make a trade based on an upward or downward trend in a market, is essential information for a trader seeking profitable trades, and why the exemplary system 700 constructed according to the present invention, based on the identification of buyer and seller order initiation and translated by iconic and echoic representation into the resultant embodiments described above, is a significant advance over other systems.

As discussed earlier, a tension exists between technical and academic approaches to trading analysis. Technical analysts observe apparently similar chart patterns repeating, while academics look for exact similarity in time, measurement, and magnitude. Both technical and academic analysts use the same periodic or fixed approach to sampling data as input to studies making the results neither precise nor repeatable with any exactness. The system of the present invention addresses the inherent weakness of the arbitrary approaches used by technical and academic analysts by measuring and evaluating market participation through the exchange auction process, and thereby focusing on the element of human participation in the exchange process that is both repeatable in action and exact in results. By doing so the system produces results that are naturally self reflective of the market trading process and 100% precise as to event timing and quality and magnitude of price changes.

The system disclosed herein provides improved performance with respect to existing methods of listing or charting securities trading prices and volumes, by graphically plotting symbolic icons and producing tonal sound patterns to simultaneously indicate, in addition to prices and volumes, less obvious but equally important transaction attributes. The system determines, either directly or by inference, at least the following attributes of a securities trade: whether or not a trade is initiated by a buyer or a seller; if more buyers or sellers are placing trading orders; the relative size of trading transactions; including whether buyer or seller orders are larger or smaller; and if the book of bid and ask offers is changing based on buying or selling activity, or the depth-of-market is simply changing. With this extra information, a trader can make a better determination about the basis for transaction prices, can conclude if trading is directionally biased into an upward or downward trend based on orders originating from buyers or sellers, and increase the probability of negotiating a better price to obtain a larger profit by assessing the bias of participants and their commitment to the perceived price direction as supported by the observation of volume traded.

The system disclosed herein and constructed according to aspects of the present invention advantageously transforms each transaction into an indicator through the use of arrow-like iconic representations. This is an improvement over prior art systems, which generally collect a group of transactions before indicating a result, thereby causing a delay before the users of such systems see some or all of the results. Such a delay is a distinct disadvantage to traders depending on the real-time display of market data to visualize and interpret trends which can be used to find trading opportunities. Moreover, a display system constructed according to aspects of the present invention provides significant advantages by indicating order flow from buyers and sellers, coupled with the result of grouping transactions into auction events based on the transaction variables of price and quantity, instead of elapsed time. The system disclosed herein offers users an immediate and constant stream of market indicators presented at near-real-time speed, thereby offering a tremendous advantage, especially for professional traders. The detailed view presented by the system allows traders to see many more configurations of trader behavior resulting in the exposure of many different types of profit taking opportunities.

An additional advantage over known systems is provided through the use of a true iconic symbol, the triangle, which indicates with the point of the triangle a direction, and implies the appropriate indication for buyer and seller orders without the use of additional color-coding. The iconic symbol conveys more than one attribute of meaning by modifying the presentation of the triangle symbol to be hollow, filled, and color-coded, thereby indicating relative transaction size. Solid triangles indicate larger transaction sizes than hollow triangles. This avoids the need for the user to manually integrate data from multiple sources, displays, or locations.

Although the description herein has discussed using the present invention as applied to futures markets and the Chicago Board of Trade and Chicago Mercantile exchanges, the present invention could be applied to any other securities markets, including equity, fixed income, currency, energy, and other markets supported by electronic exchanges.

Although an exemplary embodiment of a system constructed according to the present invention has been discussed in detail, one of skill in the art will appreciate that the exemplary embodiment could be modified to allow for iconic and/or echoic representation of transactions in any active marketplace where transaction information is shared between the buyers and sellers participating in exchanges, and trading prices can be compared to a book of outstanding bid and ask orders to interpret order initiation. The present invention may also be applied in other industries with high transaction volumes such as credit, banking, insurance, government and military procurement, healthcare, travel reservations, transportation logistics, supply chain systems, retail stores, and on-line auctions and exchanges.

The above-described embodiment of the invention is merely one example of a way in which the invention may be carried out. Other ways may also be possible and are within the scope of the following claims defining the invention.

The invention claimed is:

1. A method comprising:
   receiving, via a trader workstation having an electronic processor, transaction information and order book information for a tradeable object, the transaction information including price and volume of executed trades of the tradeable object and the order book information identifying open orders for the tradeable object;
   identifying, via the trader workstation, whether executed trades of the tradeable object are seller-initiated or buyer-initiated according to the transaction information and the order book information, where an open buy order in the order book being sold comprises a seller-initiated trade and an open sell order in the order book being bought comprises a buyer-initiated trade;
   displaying, via the trader workstation, a seller-initiated indicator for an executed trade being identified as a seller-initiated trade according to the transaction information and the order book information;
   displaying, via the trader workstation, a buyer-initiated indicator for an executed trade being identified as a buyer-initiated trade according to the transaction information and the order book information; and
   displaying, via the trader workstation, at least a subset of the order book information relating to the tradeable object adjacent the seller-initiated indicator and the buyer-initiated indicator.

2. The method of claim 1 where the seller-initiated indicator is distinguished from the buyer-initiated indicator.

3. The method of claim 2 where an appearance of the seller-initiated indicator is visually distinguished from an appearance of the buyer-initiated indicator.

4. The method of claim 1 further comprising:
   displaying, via the trader workstation, a plurality of seller-initiated indicators for a plurality of seller-initiated trades identified according to the transaction information and the order book information; and
   displaying, via the trader workstation, a plurality of buyer-initiated indicators for a plurality of buyer-initiated trades identified according to the transaction information and the order book information.

5. The method of claim 4 where the plurality of seller-initiated trades and plurality of buyer-initiated trades are within a user-selected range of trades.

6. The method of claim 4 further comprising grouping, via the trader workstation, the plurality of buyer-initiated and plurality of buyer-initiated trades within a user-selected range of trades for a trader into one or more auction events according to user-selectable criteria.

7. The method of claim 6 where for each of the one or more auction events, indicators corresponding to all trades of the auction event are displayed adjacently.

8. The method of claim 6 further comprising displaying, via the trader workstation, an auction indicator identifying each of the one or more auction events of which a displayed trader is a member.

9. The method of claim 1 where the transaction information and the order book information comprises a universal data structure including a bid quantity at a bid price, and an offer quantity at an offer price.

10. The method of claim 1 further comprising receiving, via the trader workstation, a universal data structure having a lowest trade price for the tradeable object during a current trading day, a highest trade price for the tradeable object during the current trading day, and a change in price for the tradeable object since the current trading day began.

11. A non-transitory computer readable medium having instructions stored thereon which when executed by a processor, cause the processor to carry out acts comprising:
   receiving, via a trader workstation having an electronic processor, transaction information and order book information for a tradeable object, the transaction information including price and volume of executed trades of the tradeable object and the order book information identifying open orders for the tradeable object;
   identifying, via the trader workstation, whether executed trades of the tradeable object are seller-initiated or buyer-initiated according to the transaction information and the order book information, where an open buy order in the order book being sold comprises a seller-initiated trade and an open sell order in the order book being bought comprises a buyer-initiated trade;

displaying, via the trader workstation, a seller-initiated indicator for an executed trade being identified as a seller-initiated trade according to the transaction information and the order book information;

displaying, via the trader workstation, a buyer-initiated indicator for an executed trade being identified as a buyer-initiated trade according to the transaction information and the order book information; and displaying, via the trader workstation, at least a subset of the order book information relating to the tradeable object adjacent the seller-initiated indicator and the buyer-initiated indicator.

12. The non-transitory computer readable medium of claim 11 where the seller-initiated indicator is distinguished from the buyer-initiated indicator.

13. The non-transitory computer readable medium of claim 12 where an appearance of the seller-initiated indicator is visually distinguished from an appearance of the buyer-initiated indicator.

14. The non-transitory computer readable medium of claim 11 where the acts further comprise:

displaying, via the trader workstation, a plurality of seller-initiated indicators for a plurality of seller-initiated trades identified according to the transaction information and the order book information; and displaying via the trader workstation a plurality of buyer-initiated indicators for a plurality of buyer-initiated trades identified according to the transaction information and the order book information.

15. The non-transitory computer readable medium of claim 14 where the plurality of seller-initiated trades and plurality of buyer-initiated trades are within a user-selected range of trades.

16. The non-transitory computer readable medium of claim 14 where the acts further comprise grouping, via the trader workstation, the plurality of buyer-initiated and plurality of buyer-initiated trades within a user-selected range of trades for a trader into one or more auction events according to user-selectable criteria.

17. The non-transitory computer readable medium of claim 16 where for each of the one or more auction events, indicators corresponding to all trades of the auction event are displayed adjacently.

18. The non-transitory computer readable medium of claim 16 where the acts further comprise displaying, via the trader workstation, an auction indicator identifying each of the one or more auction events of which a displayed trader is a member.

19. The non-transitory computer readable medium of claim 11 where the transaction information and the order book information comprise a universal data structure including a bid quantity at a bid price, and an offer quantity at an offer price.

20. The non-transitory computer readable medium of claim 11 where the acts further comprise receiving, via the trader workstation, a universal data structure having a lowest trade price for the tradeable object during a current trading day, a highest trade price for the tradeable object during the current trading day, and a change in price for the tradeable object since the current trading day began.

21. A method for displaying market transaction comprising:

displaying, via an electronic trader workstation operatively coupled to an exchange, an indicator identifying whether the at least one executed trade of a tradeable object was seller-initiated or buyer-initiated, where the electronic trader workstation identifies whether the at least one executed trade of the tradeable object was seller-initiated or buyer-initiated according to transaction information and order book information received from the exchange, where an open buy order in the order book being sold comprises a seller-initiated trade and an open sell order in the order book being bought comprises a buyer-initiated trade.

22. The method of claim 21 where the indicator represents a price of at least one executed trade.

23. The method of claim 21 where the indicator is displayed for each trade within a user-selected range of executed trades represented in a portion of the transaction information.

24. The method of claim 23 further comprising grouping trades within a user-selected range of trades for a trader into one or more auction events according to user-selectable criteria.

25. The method of claim 21 where the transaction information comprises a price of at least one executed trade of the tradeable object and the order book information comprises at least one open order for the tradeable object.

26. The method of claim 21 where an open sell order in the order book being bought comprises a buyer-initiated trade and an open buy order in the order book being sold comprising a seller-initiated trade.

* * * * *